United States Patent
Gronemeyer

(12) 
(10) Patent No.: US 6,850,557 B1
(45) Date of Patent: Feb. 1, 2005

(54) SIGNAL DETECTOR AND METHOD EMPLOYING A COHERENT ACCUMULATION SYSTEM TO CORRELATE NON-UNIFORM AND DISJOINT SAMPLE SEGMENTS

(75) Inventor: Steven A. Gronemeyer, Cedar Rapids, IA (US)

(73) Assignee: SiRF Technology, Inc., San Jose, CA (US)

(*) Notice: Subject to any disclaimer, the term of this patent is extended or adjusted under 35 U.S.C. 154(b) by 0 days.

(21) Appl. No.: 09/551,047

(22) Filed: Apr. 18, 2000

(51) Int. Cl.[7] .................. H04B 1/707; H04B 1/713
(52) U.S. Cl. ............... 375/150; 342/357; 342/378; 701/213; 455/12.1
(58) Field of Search .................. 375/150, 219; 342/357.1, 357.09, 357.12

(56) References Cited

U.S. PATENT DOCUMENTS

| | | | | |
|---|---|---|---|---|
| 5,592,173 A | * | 1/1997 | Lau et al. ............... | 342/357.12 |
| 5,825,327 A | * | 10/1998 | Krasner ................. | 342/357.09 |
| 5,852,630 A | * | 12/1998 | Langberg et al. ........... | 375/219 |
| 6,236,359 B1 | * | 5/2001 | Watters et al. ............ | 342/357.1 |

* cited by examiner

*Primary Examiner*—Shuwang Liu
*Assistant Examiner*—Eva Zheng
(74) *Attorney, Agent, or Firm*—Edward C. Kwok; MacPherson Kwok Chen & Heid LLP

(57) ABSTRACT

A signal detector employs a coherent accumulation system that coherently combines the correlation results derived from segments of samples of a received signal. The segments may have non-uniform lengths and may have been obtained over different and non-overlapping time periods. The segments are obtained during sampling windows of arbitrary length and at arbitrary times, and the results of processing the segments are successively combined in a coherent manner (separate magnitude and phase accumulation) until a threshold signal-to-noise ratio (SNR) has been achieved. Coherent integration is enabled by introducing a carrier phase offset as well as a code phase offset, so that different segments are aligned in carrier phase as well as code phase. Although not limited to this application, in one implementation example, the signal detector is used in connection with and as part of a global positioning system (GPS) receiver.

55 Claims, 13 Drawing Sheets

GPS RECEIVER
(OPERATION METHOD)
80'

GPS RECEIVER
(OPERATION METHOD)
80'

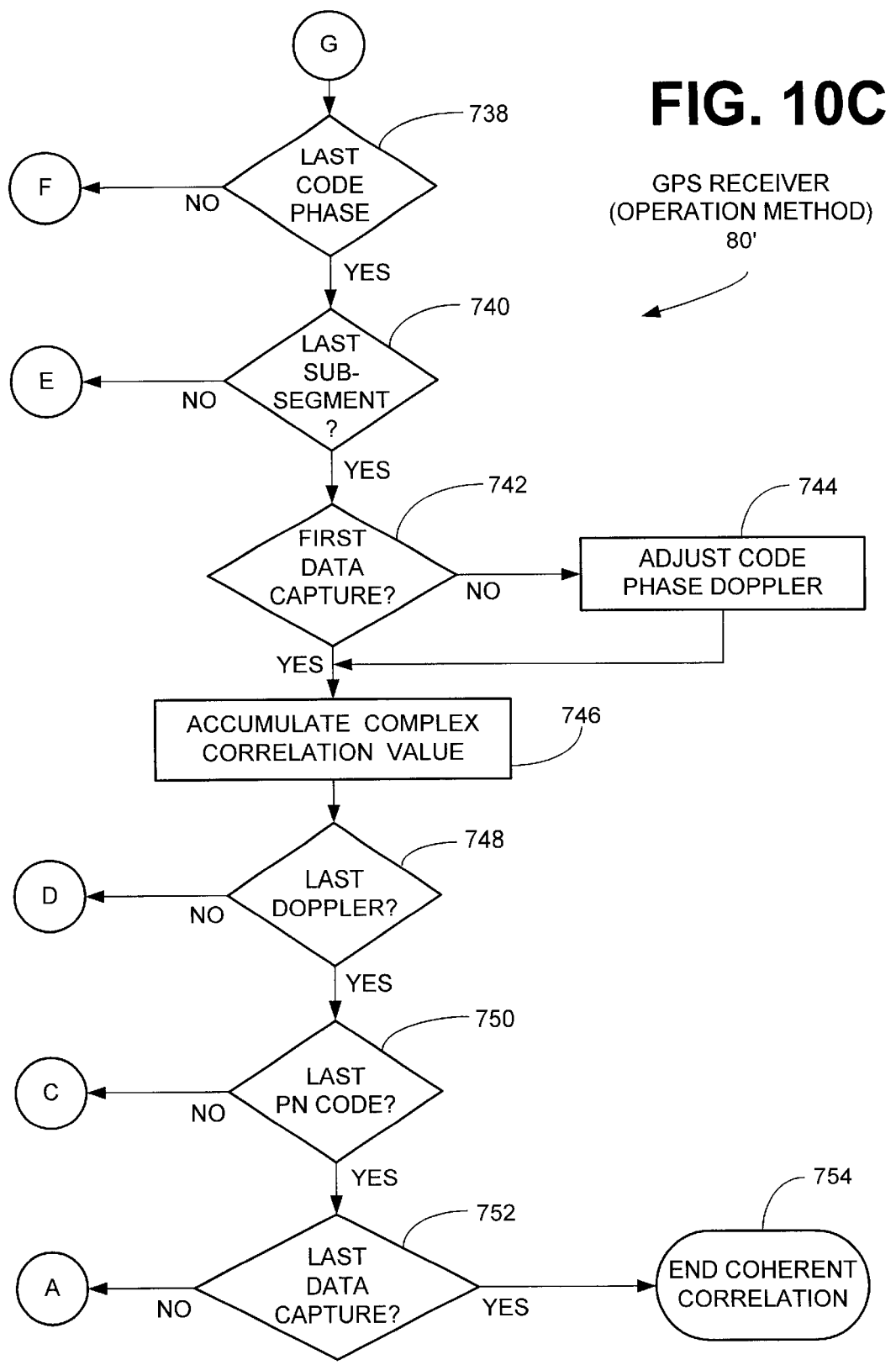

US 6,850,557 B1

SIGNAL DETECTOR AND METHOD EMPLOYING A COHERENT ACCUMULATION SYSTEM TO CORRELATE NON-UNIFORM AND DISJOINT SAMPLE SEGMENTS

TECHNICAL FIELD

This invention relates to the field of signal detection using correlation analysis, and more specifically, to correlation analysis in which the results of analyzing segments of samples separated in time and possibly having non-uniform lengths are coherently combined to achieve a greater effective signal-to-noise ratio (SNR).

BACKGROUND OF THE INVENTION

The NAVSTAR global positioning system (GPS) is a collection of 24 earth-orbiting satellites. Each of these GPS satellites travels in a precise orbit about 11,000 miles above the earth's surface. A GPS receiver locks onto at least 3 of the satellites, and responsive, thereto, is able to determine its precise location. Each satellite transmits a signal modulated with a unique pseudo-noise (PN) code. Each PN code comprises a sequence of 1023 chips that are repeated every millisecond consistent with a chip rate of 1.023 MHz. Each satellite transmits at the same frequency. For civil applications, the frequency is known as L1 and is 1575.42 MHz. The GPS receiver receives a signal that is a mixture of the transmissions of the satellites that are visible to the receiver. The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then used the shifted PN code to achieve synchronization with subsequent transmissions from the satellite.

The receiver determines its distance from the satellite by determining the code phase of the transmission from the satellite. The code phase (CP) is the delay, in terms of chips or fractions of chips, which a satellite transmission experiences as it travels the approximately 11,000 mile distance from the satellite to the receiver. The receiver determines the code phase for a particular satellite by correlating shifted versions of the satellite's PN code with the received signal after correction for Doppler shift. The code phase for the satellite is determined to be the shift that maximizes the degree of correlation with the received signal.

The receiver converts the code phase for a satellite to a time delay. It determines the distance to the satellite by multiplying the time delay by the velocity of the transmission from the satellite. The receiver also knows the precise orbits of each of the satellites. The receiver uses this information to define a sphere around the satellite at which the receiver must be located, with the radius of the sphere equal to the distance the receiver has determined from the code phase. The receiver performs this process for at least three satellites. The receiver derives its precise location from the points of intersection between the at least three spheres it has defined.

The Doppler shift (DS) is a frequency shift in the satellite transmission caused by relative movement between the satellite and the receiver along the connection-of-sight (LOS). It can be shown that the frequency shift is equal to $$\frac{v_{LOS}}{\lambda},$$

where $v_{LOS}$ is the velocity of the relative movement between the satellite and receiver along the LOS, and $\lambda$ is the wavelength of the transmission. The Doppler shift is positive if the receiver and satellite are moving towards one another along the LOS, and is negative if the receiver and satellite are moving away from one another along the LOS.

The Doppler shift alters the perceived code phase of a satellite transmission from its actual value. Hence, the GPS receiver must correct the satellite transmissions for Doppler shift before it attempts to determine the code phase for the satellite through correlation analysis.

The situation is illustrated in FIG. 1, which shows a GPS receiver 10 and three GPS satellites 12a, 12b, and 12c. Each satellite 12a, 12b, 12c is transmitting to the GPS receiver 10. Satellite 12a is moving towards the GPS receiver 10 along the LOS at a velocity $v_a{}^+14$; satellite 12b is moving away from the GPS receiver 10 along the LOS at a velocity $v_c{}^-16$; and satellite 12c is moving away from the GPS receiver 10 along the LOS at a velocity $v_c{}^-18$. Consequently, assuming a carrier wavelength of $\lambda$, the transmission from satellite 12a will experience a positive Doppler shift of $$\frac{v_a^+}{\lambda};$$

the transmission from satellite 12b will experience a negative Doppler shift of $$\frac{v_b^-}{\lambda};$$

and the transmission from satellite 12c will experience a negative Doppler shift of $$\frac{v_c^-}{\lambda}.$$

The GPS receiver 10 functions by sampling a finite portion of the received signal 20 and then processing the samples. Typically, external constraints limit the size and occurrence of the sampling period. For example, in the case of a mobile wireless phone integrated with a GPS receiver 10, the sampling window should be limited to those periods in which the phone is not transmitting. The purpose is to avoid interference between the transmitter and the GPS receiver 10.

The problem is that the signal-to-noise (S/N) ratio of the received signal 20 over a finite sampling window may not be sufficient to detect the presence and range of the satellites. For example, the signal may be such that there is no correlation value for a particular set of hypotheses which is significantly larger than the correlation values resulting from the other hypotheses tested.

Moreover, it is difficult to combine segments of samples captured over different periods of time because each is subject to a different code phase which must be accounted for before the segments can be combined, and these code phases are unknown. In an effort to increase the SNR of the received signal 20, prior art receivers are thus required to either forgo operation during times in which the received signal 20 is weak, or to extend the sampling period beyond the limits imposed by external constraints. In certain applications, such as the case of a GPS receiver 10 integrated with a mobile wireless phone, extension of the sampling window is not usually feasible since it would subject the received signal to unacceptable interference from the phone's transmitter. In such applications, the practical effect is to forego operation of the GPS receiver 10 when the received signal 20 is weak. Such occurrences are frequent because of the approximately 11,000 mile distance traveled by the GPS satellite transmissions, because of blockage, multipath fading or attenuation due to buildings, terrain or trees, and because of the noise to a particular satellite represented by the other satellite's transmissions.

Consequently, there is a need for a signal detector that overcomes the disadvantages of the prior art. Similarly, there is a need for a GPS receiver 10 that overcomes the disadvantages of the prior art.

SUMMARY OF THE INVENTION

This invention provides a signal detector that employs a coherent accumulation system that coherently combines the correlation results derived from segments of samples of a received signal. The segments may have non-uniform lengths and may have been obtained over different and non-overlapping time periods. The segments are obtained during sampling windows of arbitrary length and at arbitrary times, and the results of processing the segments are successively combined in a coherent manner (separate magnitude and phase accumulation) until a threshold signal-to-noise ratio (SNR) has been achieved. In accordance with a notable feature of the coherent accumulation system of this invention, coherent integration is enabled by introducing a carrier Doppler phase offset as well as a code Doppler phase offset, so that different segments are aligned in phase.

In architecture, the coherent accumulation system may be implemented in a receiver configured to receive a first segment of a signal and a second segment of the signal that are acquired during different time periods. The received signal comprises a signal of interest perturbed by noise or pseudo-noise. The signal detector, which includes the coherent accumulation system, includes a correlator and a combiner. The correlator derives first correlation data representative of a first correlation between the first segment and a hypothesis. The correlator imposes a carrier phase offset upon the second segment so that a carrier phase of the second segment corresponds to that of the first segment. Further, the correlator derives second correlation data representative of a second correlation between the phase shifted second segment and the hypothesis. A combiner, such as an integrator, coherently combines the first and second correlation data to obtain cumulative correlation data useful for detecting the signal of interest or a parameter of the signal of interest.

Although not limited to this particular implementation, the signal detector can be utilized in and as part of a GPS receiver, and it will be briefly described here in this context. In this embodiment, the GPS receiver may comprise, for example, a radio frequency (RF) receiver, offset measurement circuitry, a PN code generator, the signal detector, a GPS processor. The RF receiver demodulates the received signal to obtain a baseband signal. The PN code generator generates the PN code hypotheses that are correlated with signal samples in the signal detector. The signal processor processes the segment of samples in accordance with a plurality of PN code, Doppler shift, and code phase hypotheses.

For each segment of samples, the signal detector outputs correlation data derived by correlating various combinations of PN code, Doppler shift, and code phase hypotheses with the segment of samples. According to this implementation example, the correlation data can be grouped into groupings that correspond to various combinations of specific hypotheses and ranges of hypotheses. The correlation data comprises a plurality of arrays, wherein each array corresponds to a PN code hypothesis, each row of an array corresponds to a Doppler shift hypothesis, each column of an array corresponds to a code phase hypothesis, and each entry in the array is a measure of the degree to which the combined PN code, Doppler shift, and code phase hypothesis corresponding to the entry correlates to the samples.

The GPS processor directs the signal detector to process each segment of samples. The GPS processor also, responsive to timing signals generated locally by the GPS radio receiver, generates frame marks which are input to the offset measurement circuitry. The offset measurement circuitry determines the offset between the time that a data capture command is issued by the GPS processor and the timing of the next frame mark. This information is provided to the GPS processor for use in determining a carrier phase offset and a code phase offset, so that the correlation results of processing different segments of samples can be coherently combined.

Correlation data is coherently accumulated. When the correlation data for a new segment of samples is obtained, the new correlation data is coherently combined with the cumulative correlation data. The GPS processor accumulates the correlation data for a particular satellite until a threshold SNR is achieved. The data for a particular satellite is maintained until the presence and range of the satellite can be determined.

Related methods of operation and computer readable media are also provided. Furthermore, other systems, methods, features, and advantages of this invention will be or become apparent to one with skill in the art upon examination of the following figures and detailed description. It is intended that all such additional systems, methods, features, and advantages be included within this description, be within the scope of this invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of this invention. Moreover, in the drawings, like reference numerals designate corresponding parts throughout the several views.

FIGS. 10A–10C illustrate an implementation example of a method of operation of the GPS receiver of FIG. 5.

DETAILED DESCRIPTION OF THE PREFERRED EMBODIMENTS

Figure 2:
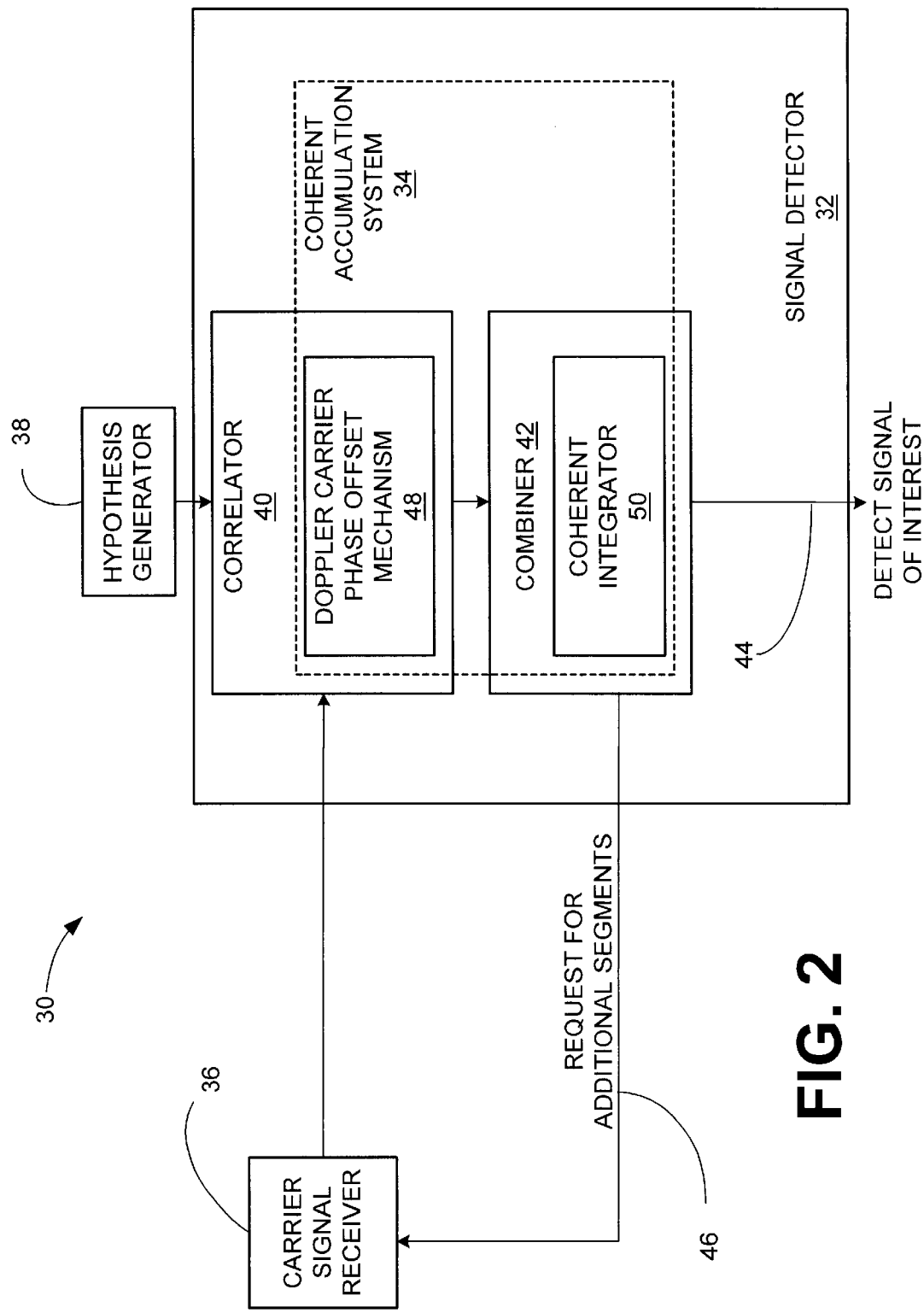
FIG. 2 illustrates an implementation example of a receiver having a signal detector that includes the coherent accumulation system of this invention for quickly and efficiently processing the signals of FIG. 1.

A. Receiver Having A Signal Detector Employing The Doppler Phase Correction System 1. Architecture A block diagram of a generalized embodiment (a non-limiting implementation example) of a receiver 30 that employs a signal detector 32 having the coherent accumulation system 34 in accordance with the subject invention is illustrated in FIG. 2. As illustrated, the receiver 10 comprises a carrier signal receiver 36, for example but not limited to, a conventional radio frequency (RF) receiver, for receiving a carrier signal, continuously or intermittently, encoded with any type of data. Segments of the signal are acquired, and the segments of the signal may be of non-uniform-length and may be disjoint and separated by arbitrary periods of time. The signal may comprise a signal of interest perturbed by noise or pseudo-noise. As an example, in accordance with a spread spectrum modulated signal, the signal may comprise the combination of multiple signals of interest each encoded using one of a plurality of pseudo-random noise (PN) codes (e.g., gold codes). In this case, other signals appear as noise to a particular coded signal of interest. The samples of the signal each have an in-phase component (I; real number component) and a quadrature phase component (Q; imaginary number component) which are collectively indicative of phase and magnitude and can be represented mathematically as a complex number of the following form: I+jQ.

A hypothesis generator 38 generates a plurality of hypotheses about the signal of interest. In the context of a spread spectrum signal that is direct sequence modulated via a PN code, the hypothesis may include, among other things, a code, a code phase, and a Doppler signal phase shift between the signal source and the receiver 30.

A correlator 40 of any suitable type receives the plurality of hypotheses from hypothesis generator 38, and the segment received by receiver 36, and responsive thereto, generates correlation data representative of the correlation between the received segment and the plurality of generated hypotheses. Various types of correlators 40 are well known in the art. As an example, it could be as simple as a signal mixer or multiplier.

The correlation data is provided to combiner 42 which combines the correlation data with correlation data accumulated from previous segments received by receiver 36, if any. The correlation data may be combined using any suitable technique, for instance, integration, accumulation, averaging, etc. Once the data has been combined, combiner 42 determines whether the cumulative correlation data is sufficient to permit a parameter of the signal of interest to be detected. The correlation values are analyzed, and one of the tested hypotheses is selected as the correct one. In one implementation example, this is accomplished through peak detection, according to which a correlation value is selected which has a significantly larger magnitude than that of the other correlation values. The hypothesis corresponding to this correlation value is then selected as the correct hypothesis.

If one of the tested hypothesis is identified as a match, an appropriate output is provided on signal connection 44 ("connection" herein means one or more lines), signaling detection of the parameter of the signal of interest. If not, an appropriate signal is provided to the receiver on signal connection 46 indicating the need for additional segments. Optionally, the foregoing process iterates until the parameter of the signal of interest is detected (or a time-out condition is detected).

In accordance with this invention, a coherent accumulation system 34 enhances the speed and efficiency of the correlation and integration processes associated with the signal detector 32. More specifically, the coherent accumulation system 34 provides a carrier phase offset mechanism 48 associated with the correlator 40 and a coherent integrator 50 associated with the combiner 42. The carrier phase offset mechanism 48 essentially performs an adjustment on the data that is correlated in order to compensate for the carrier Doppler phase shift in the carrier signal between separate data segments pertaining to separate data captures, so that the correlation values pertaining to separate data captures are combinable in a coherent manner.

The coherent accumulation system 34 further provides for a coherent integrator 50 associated with the combiner 42 for "coherently" integrating the correlation values. The coherent integrator also imposes a code Doppler phase offset upon the correlation values to correct for code Doppler phase shift. The coherent integration is made possible because of the carrier phase offset imposed by the carrier phase offset mechanism 48 as well as the code Doppler phase shift that is imposed by the coherent integrator. In the context of this document, "coherent" means that the values are combined so that magnitudes and phases (which can be defined by real and imaginary components of a complex number) are preserved and are combined respectively. As is well known in the art, coherent integration enables faster and more efficient correlation than noncoherent correlation (where only magnitudes, not phases, and accumulated), or said another way, enables the signal to build up faster than the noise so that the S/N value increases faster.

The hypothesis generator 38, correlator 40, combiner 42, and parts thereof can be implemented in hardware, software, firmware, or a combination thereof. As an example, each or all can be implemented with software that is executed by a suitable processor, such as a conventional digital signal processor (DSP) and/or general purpose microprocessor. As an example of an alternative, the correlator 40 may be implemented using a well known matched filter in hardware-based combinational logic. When any of the foregoing elements 38, 40, and 42 are implemented in hardware, they can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

When any of the foregoing elements 38, 40, and 42 are implemented in software or firmware, which comprises an ordered listing of executable instructions for implementing logical functions, they can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

2. Phase Shifts And Offsets

In order to optimize coherent integration with the coherent accumulation system 34 (FIG. 2) of this invention, the Doppler phase shift in both the carrier signal and code phase between data captures (segments), which can vary in duration and which are not obtained on a known periodic basis, should be accounted for, so that the carrier phase and code phase relationships of separate data captures can be maintained and coherently combined. Note, however, that it is possible to practice one of the foregoing without practicing the other.

a. Carrier

Figure 3:
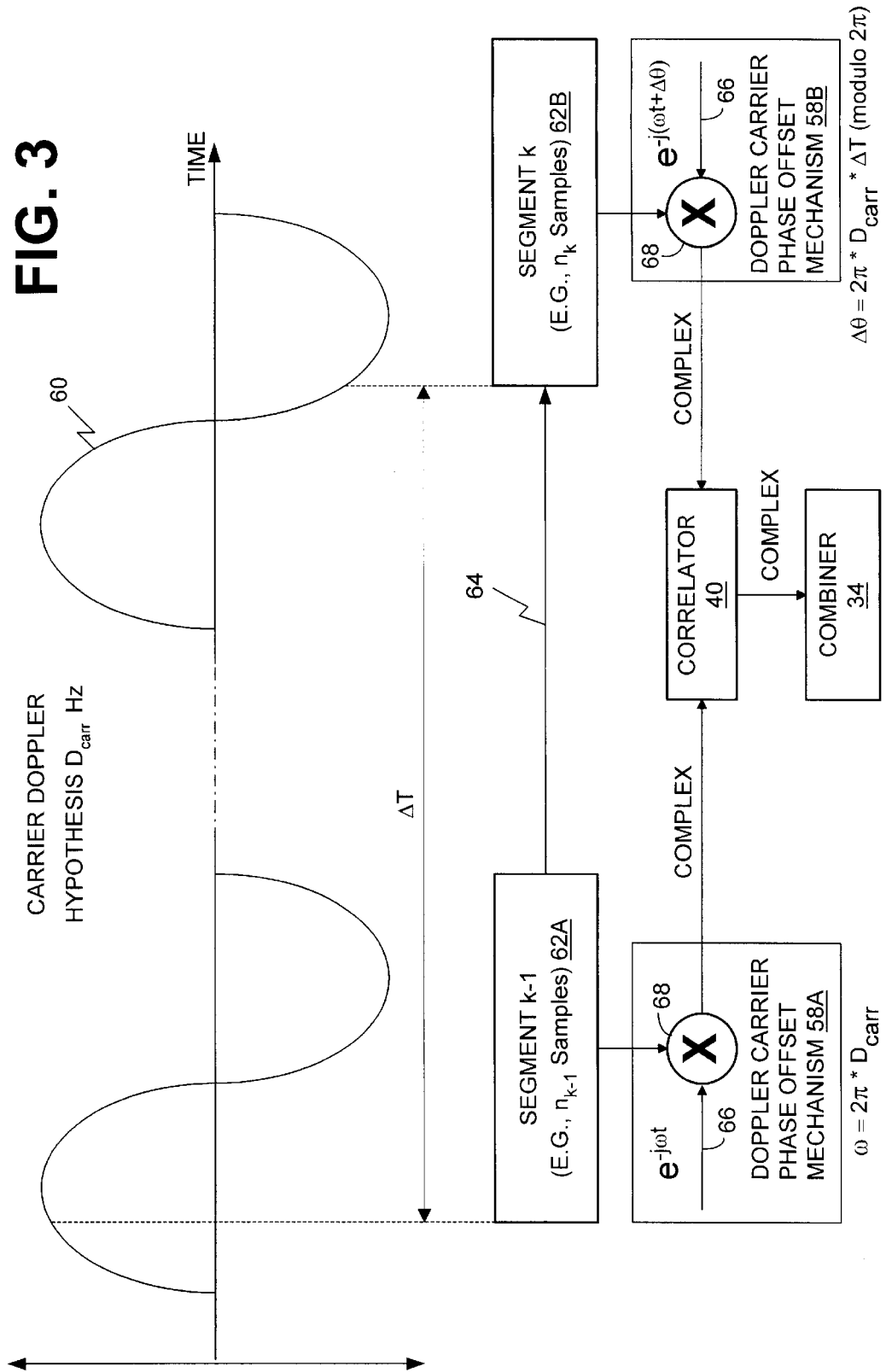
FIG. 3 illustrates the coherent accumulation system of FIG. 2.
Figure 4:
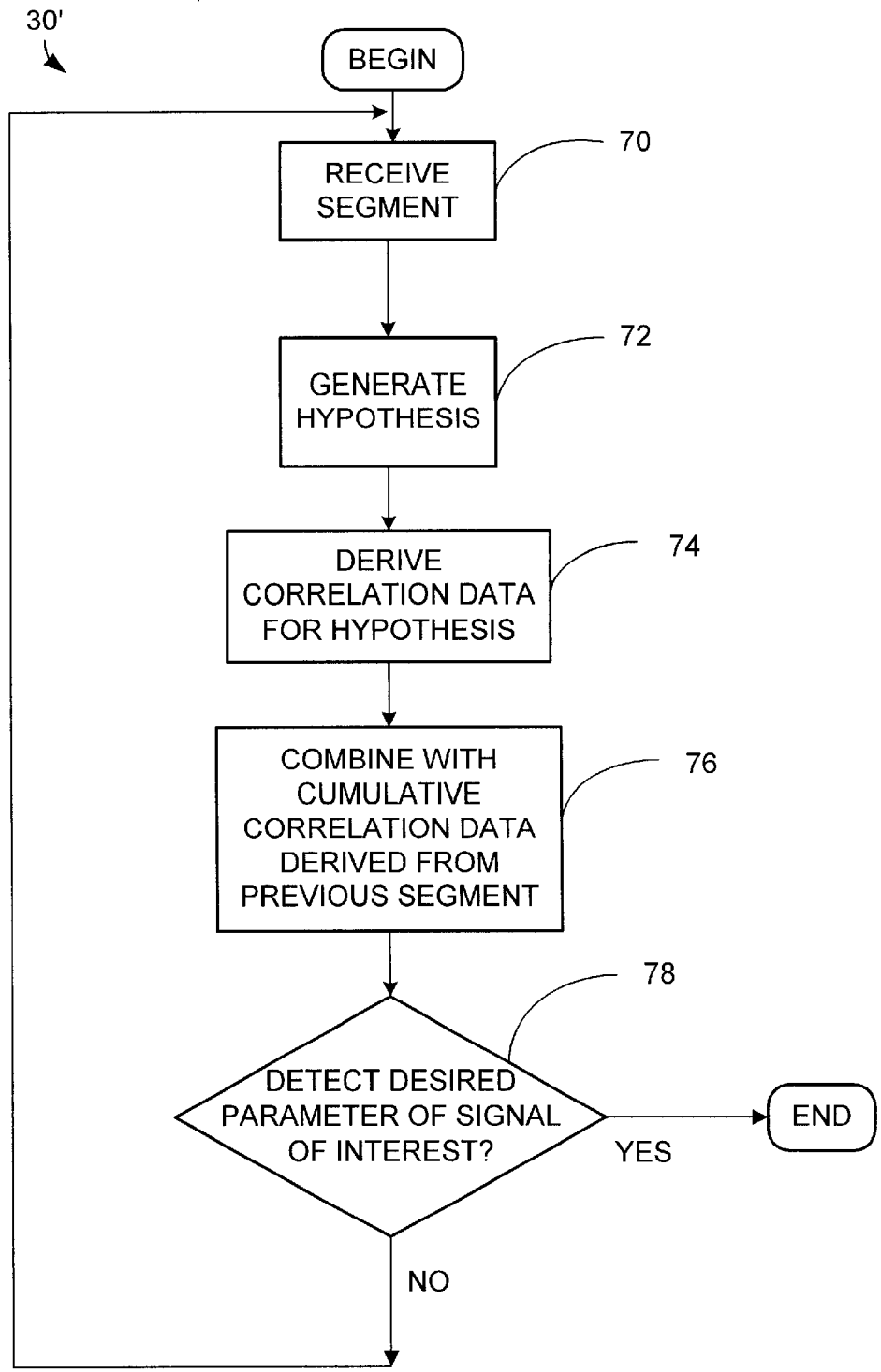
FIG. 4 illustrates an implementation example of a method of operation of the receiver of FIG. 1.

With reference to FIG. 3, the carrier Doppler hypothesis $D_{carr}$ (Hz; i.e., hypothesized Doppler shift) associated with a received carrier signal is denoted by reference numeral 60. When the receiver 30 (see FIG. 2) operates, the receiver 30 is designed to capture data periodically, but not on a known fixed time basis. For example, the carrier signal receiver 36 (FIG. 2) may be designed to be deactivated, in whole or in part, after a data capture in order to preserve power. FIG. 3 shows first and second segments 62a and 62b pertaining to first and second data captures, which are spaced in time, as indicated by arrow 64, and which can exhibit the same or different time durations. First segment 62a, second segment 62b and other segments processed by the apparatus and method of this invention are generally referred to hereinafter as segment 62. Moreover, in the context of a direct sequence spread spectrum signal, each segment 62 is correlated with a code phase (sequence of bits) of a particular code that is being tested in an attempt to detect the correct code and code phase.

As is clear from FIG. 3, the start times associated with each of the segments 62a, 62b do not coincide with the same phase of the Doppler shift signal 60. Hence, unless segment 62a and 62b are normalized to the same Doppler phase, they cannot be combined coherently. In accordance with the coherent accumulation system 34 of this invention, after a first segment 62a is obtained, a Doppler phase offset 66 is imposed upon each new segment 62b, so that subsequent segments 62b are aligned in Doppler phase to the preexisting first segment 62a (or previous segments 62). As a result, the correlation values pertaining to the first segment 62a (or accumulated correlation value pertaining to previous data segments 62) and all subsequent segments 62b can be combined coherently.

The carrier phase offset 66 can be imposed by Doppler carrier phase offset mechanisms 58a and 58b (see also mechanism 48 on FIG. 2) upon the subsequent segments 62 using any suitable technique, for example but not limited to, use of a multiplier 68, which combines a phase shift $e^{-jwt} = e^{-j\theta}$, where $\theta$ is the Doppler shift to each subsequent segment 62b. Furthermore, the phase shifted data can then be correlated with the hypotheses in correlator 40 and then coherently combined with the correlation value corresponding with the prior segment 62a (or cumulative correlation value corresponding to a plurality of previous segments 62) in the combiner 42 (FIG. 2). The result is a cumulative correlation that more quickly identifies whether or not a code and code phase are correct.

b. Code

In order to further optimize the coherent integration process with the coherent accumulation system 34 (FIG. 2) of this invention, the code Doppler phase shift between code of the data captures (segments), which can vary in duration and which are not obtained on a known periodic basis, should be accounted for, so that the code phase relationship of separate data captures can be maintained and optimally coherently combined.

The correlation data for different segments 62 of samples are combined using an algorithm that allows for the differing code phases between the segments 62 to be accounted for even through the actual code phases are unknown. This process is more fully described later in this document in connection with FIGS. 10A–10C.

3. Operation

A flowchart of an implementation example of a method of operation of the receiver 30 (FIG. 2) employing the coherent accumulation system 34 in accordance with the subject invention is illustrated in FIG. 3 and generally denoted by reference numeral 30'. As illustrated, the process begins at step 70, in which a segment 62 of the type described earlier is received.

Next, in step 72, a plurality of hypotheses are generated for testing. In the context of a spread spectrum signal that is direct sequence modulated via a PN code, the hypothesis may include, among other things, a code, a code phase, and a Doppler signal phase shift between the signal source and the receiver 30 (FIG. 2).

Further, at step 74, correlation data measuring the level of correlation between the received sample and the generated hypotheses is derived. The process of correlation is well known in the art.

In accordance with this invention, at step 74, the segment 62 that is currently at issue is adjusted, or altered, via a carrier phase offset 66 (FIG. 3), if previous correlation data already exists, so that the correlation value pertaining to the current segment 62 can be coherently combined with a preexisting cumulative correlation value pertaining to previous segments 62. Essentially, a carrier phase offset 66 is combined with the current segment 62 at issue, so that the associated carrier Doppler phase substantially matches that of the previous segments 62 associated with the preexisting correlation value(s). Moreover, the foregoing data segments 62 (data captures) can be noncontiguous in time and can be of different durations. This carrier phase offset 66 ultimately enables the correlation values to be coherently combined.

In step 76, the correlation data from step 76 is combined cumulatively and coherently with existing correlation data if any exists from correlation analysis performed on previous segments 62, or otherwise the correlation data is stored as the first sample in the accumulation process. In accordance with the preferred embodiment of this invention, the correlation data is adjusted or altered, via the code phase offset, so that it is coherently combinable with the cumulative correlation data.

Moreover, at step 78, a determination is made whether the cumulatively derived correlation data permits accurate and reliable detection of a desired parameter of the signal of interest. If so, the process ends. If not, a jump is made to step 70 and the process repeats itself from this point with a new segment 62. Optionally, the process iterates until the desired parameter of the signal of interest is detected (or a time-out condition occurs).

B. GPS Receiver

1. Architecture

It is contemplated that the foregoing receiver 30 (FIG. 2), particularly, the coherent accumulation system 34 (FIG. 2) of this invention, can be beneficially employed in a variety of applications, such as in a GPS receiver 80. In the context of this document, "global positioning system" or "GPS" means any system utilizing satellites and/or land-based communications devices for providing or enabling the determination of a location on the earth, including but not limited to, NAVSTAR, GLONASS, LORAN, Shoran, Decca, or TACAN.

Figure 5:
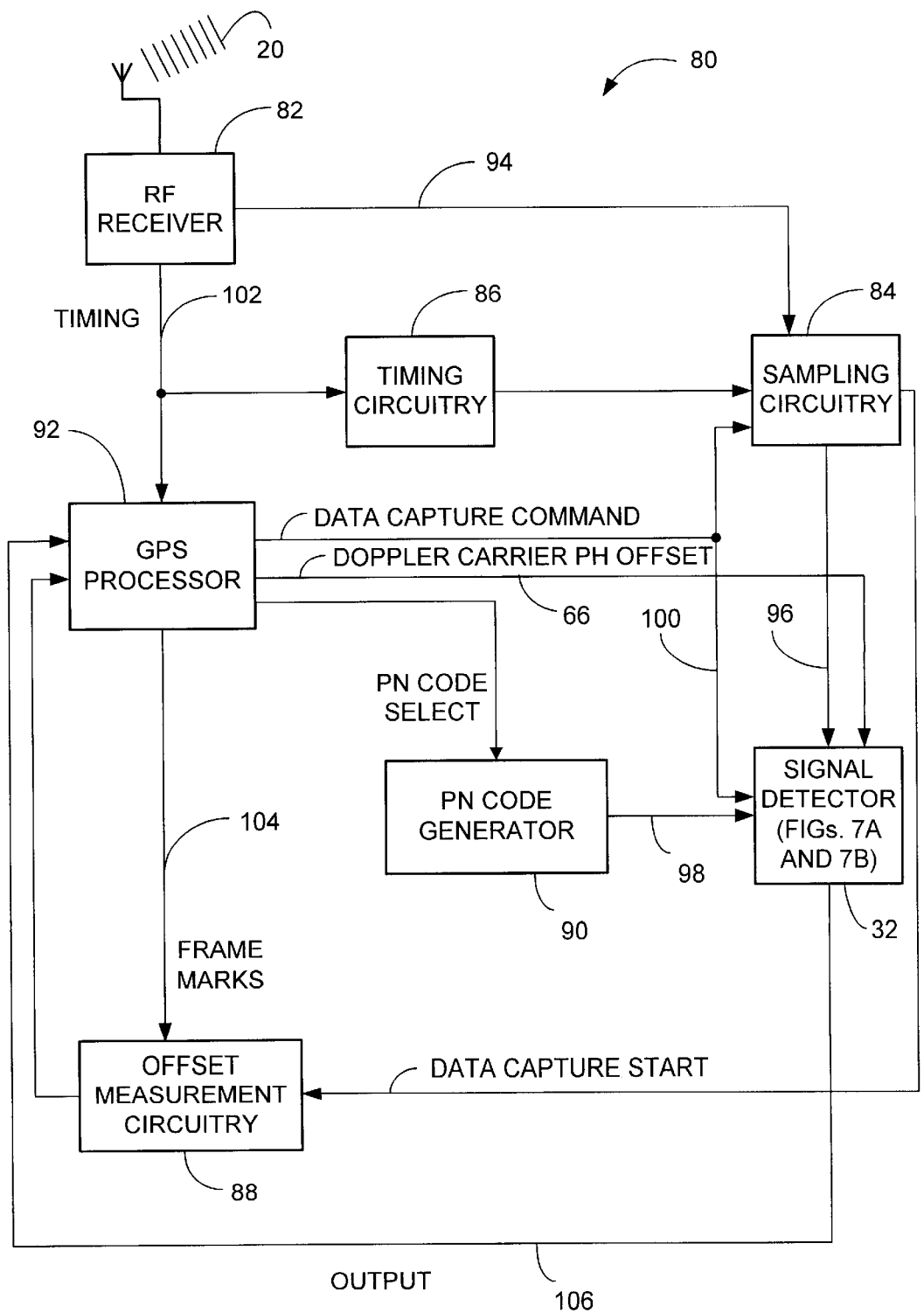
FIG. 5 illustrates an implementation example of a GPS receiver that employs the signal detector having the coherent accumulation system of FIGS. 2 and 3.

One example of a GPS receiver 80 that employs the coherent accumulation system 34 in accordance with the subject invention is illustrated in FIG. 5 and is generally denoted by reference numeral 80. As shown, the GPS receiver 80 comprises a conventional radio frequency (RF) receiver 82, sampling circuitry 84, timing circuitry 86, offset measurement circuitry 88, a PN code generator 90, a signal detector 32 (see also signal detector 32 of FIG. 2 and high level signal detector 92 in FIG. 7A and low level in FIG. 7B), and a GPS processor 92, which can be any suitable general purpose or custom made digital signal processor (DSP) or microprocessor without or with support circuitry, as needed.

Figure 6:
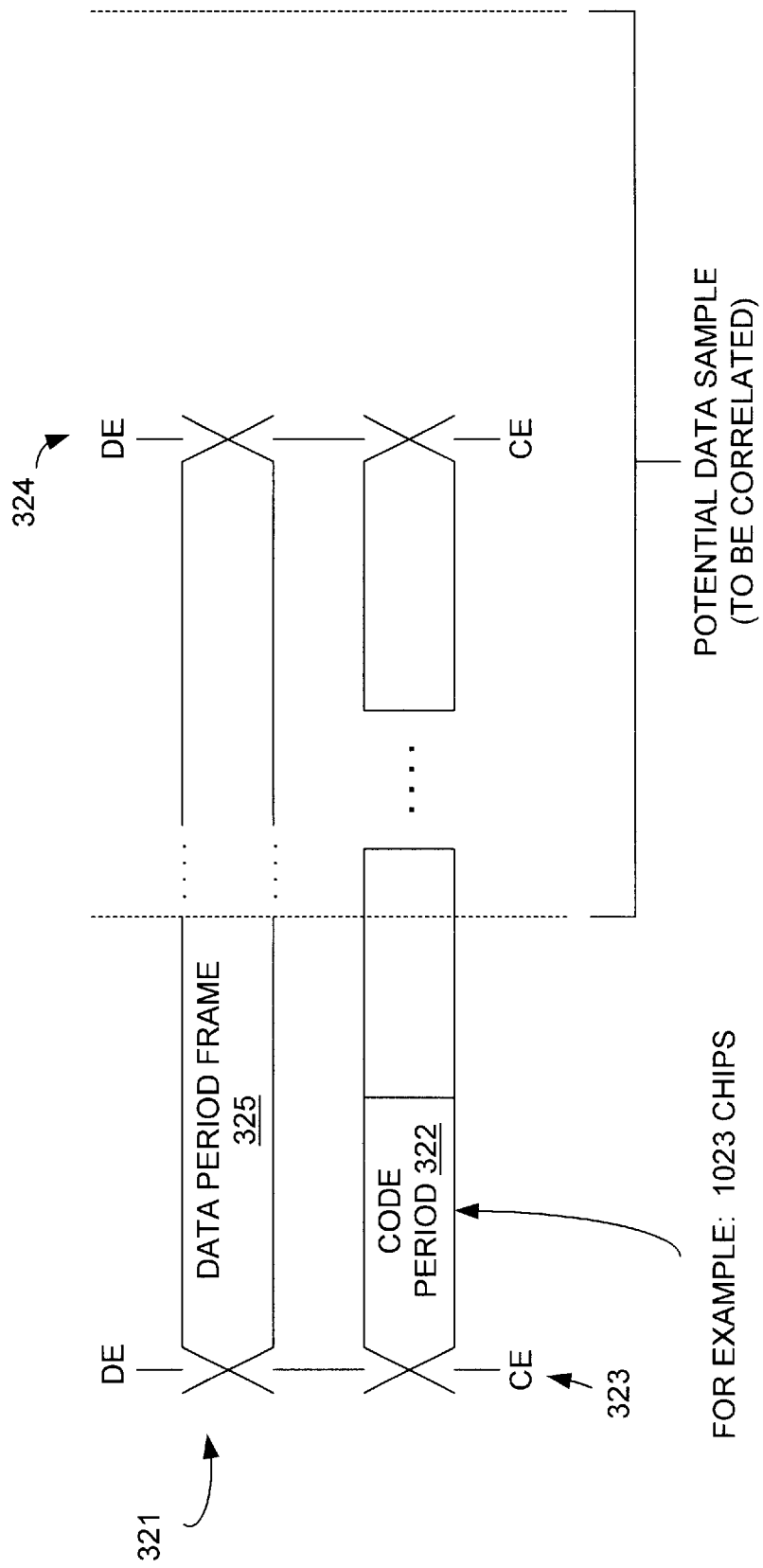
FIG. 6 illustrates a data format associated with GPS signals transmitted from the satellites of FIG. 1.

The format of each satellite signal 321 is depicted in FIG. 6. As is well known in the art, each satellite signal comprises, among other things, a repeating PN code unique to the satellite. Each period 322 of the PN code comprises 1023 bits, or "chips," which repeat every 1 millisecond (ms), for a nominal chip rate of 1.023 MHz. The point of demarcation between successive code periods is called a "code epoch," which is denoted by reference numeral 323 (CE).

Each satellite signal 323 is also modulated with a 50 Hz data signal. More specifically, as shown in FIG. 6, every twentieth code epoch 223 corresponds to a data epoch (DE) 324, where a new frame 325 begins. The frames 325 are coded via differential phase shift keying (PSK), where successive frames 325 change phase (phase reversal by 180 degrees) to indicate one logic state (1 or 0) or remain in the same phase relationship (0 degrees phase shift) to indicate another logic state. Thus, a frame 325 includes 20 code periods 322 (20 ms), each frame 325 is separated by a data epoch 324, and each code period 322 is separated by a code epoch 323. One purpose, among others, of the 50 Hz data signal encoded on signal 321 is to convey location information about the satellite to the receiver 50.

With reference again to FIG. 5, the RF receiver 82 demodulates the received signal to obtain a baseband signal that is provided to the sampling circuitry 84 over signal connection 94. The sampling circuitry 84 provides, responsive to timing signals produced by the timing circuitry 86, a segment 62 of samples of the baseband signal taken over a defined sampling window. The segment 62 of samples is provided to the signal detector 92 over signal connection 96. The signal detector 32, which includes the correlator 40 (FIG. 2) and combiner 42 (FIG. 2) as well as the coherent accumulation system 34 of this invention, processes the segments 62 of samples in accordance with a plurality of PN code, Doppler shift, and code phase hypotheses.

Figure 1:
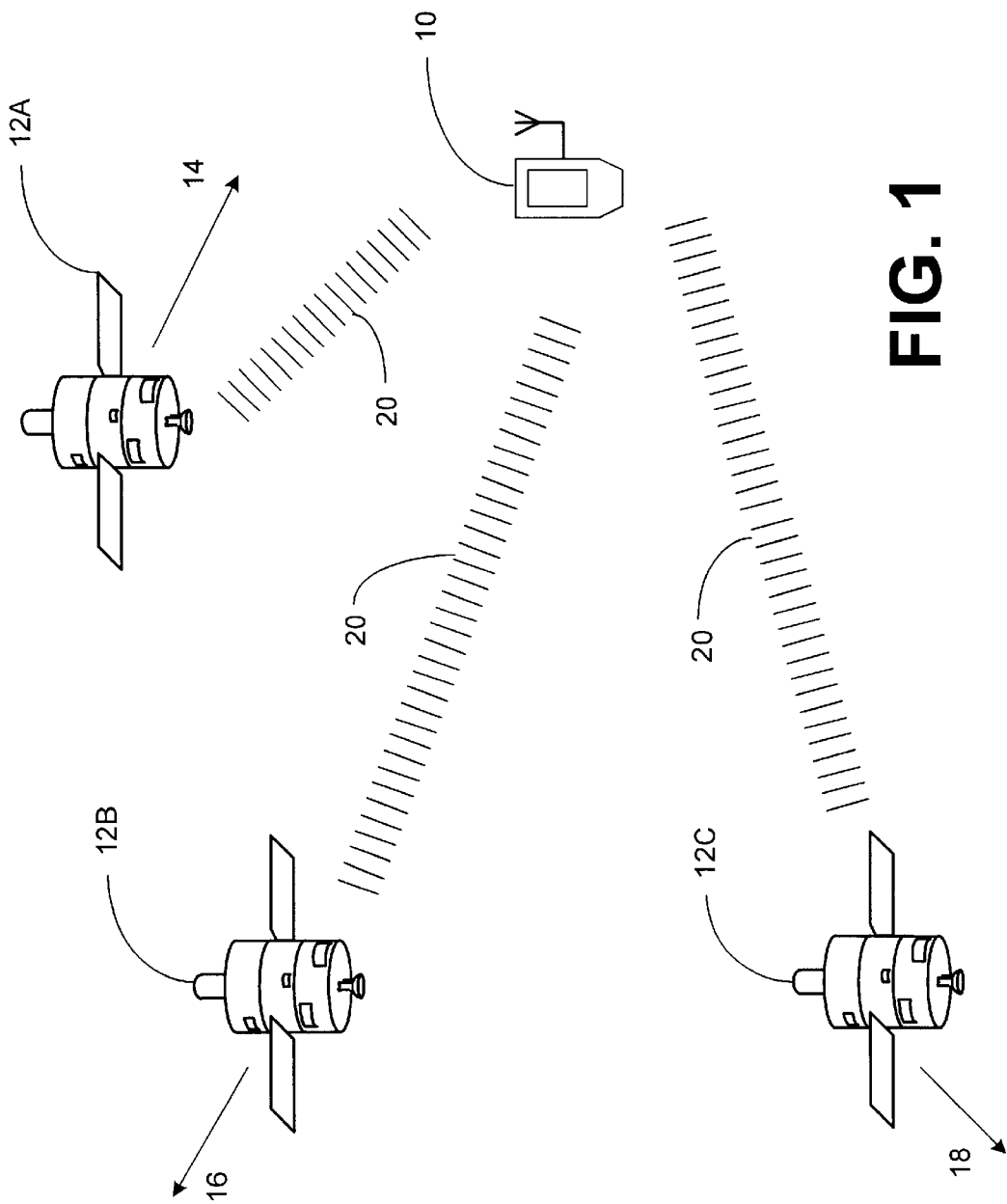
FIG. 1 illustrates satellites transmitting spread spectrum modulated signals, for example, GPS signals, to a receiver.

The PN code generator 90 generates the PN code hypotheses that are provided as inputs to the signal detector 92 over signal connection 98. In one example, the Doppler shift hypotheses are generated internally within the signal detector 32. The GPS processor 92 issues data capture commands on signal connection 100 to the sampling circuitry 84 and the signal detector 32 directs the sampling circuitry 84 to capture a segment 62 of samples, and directs the signal detector 32 to process the segment 62 of samples. The GPS processor 92 also, responsive to timing signals generated locally by the RF receiver 82 and received over signal connection 102, generates frame marks which are input to the offset measurement circuitry 88 over signal connection 104. Although not limited to this configuration, in one implementation example, the timing signals generated by the RF receiver 82 are generated by a local oscillator within the RF receiver. The timing signals define a local time base that is related to the time base maintained by the GPS satellites 12a, 12b or 12c (FIG. 1).

The offset measurement circuitry 88 determines the offset between the precise time that a data capture command is issued by the GPS processor, which is actually started by the sampling circuitry 84, and the time of the next frame mark. This information is provided to the GPS processor 92 for use in determining the Doppler phase shift between segments 62 (FIG. 3) and ultimately coherent combining, in a manner to be described subsequently, the results of processing different segments 62 of samples.

Significantly, in accordance with this invention, as shown in FIG. 5, the GPS processor 92 generates a carrier phase offset θ(t) 66 (see also FIG. 3) that is forwarded to the signal detector 32, in particular to a Doppler shift generator 401 (FIGS. 7A and 7B), which introduces the carrier phase offset 66 to incoming data segments 62, as appropriate. The GPS processor 93 is able to generate the carrier phase offset θ(t) 66 based upon the frame marks and the offsets (OS) of the two segments 62 pertaining to the two segments 62 whose correlation values are sought to be coherently combined. The foregoing information is used by the GPS processor to compute the difference in start time between the two segments 62, and this time difference information along with the phase difference between the start of the two segments 62 yields the carrier phase offset 66.

2. Specific Implementation Example

A signal detector chip named "Magna" which combines the functionality of the sampling circuitry 84, the timing circuitry 86, offset measurement circuit 88, and the signal detector 32 of FIG. 5 has been developed by the assignee of the subject application (Conexant Systems, Inc., of Newport Beach, Calif., U.S.A.). A processor chip which embodies the functionality of the GPS processor 92 of FIG. 5 code-named "Scorpio", Part No. 11577-11, is commercially available from the assignee of the subject application. In one implementation example, the processor has additional GPS-specific circuits, such as tracking channels for continuously tracking a number of GPS satellite signals. Typically, the processor 92 includes at least an embedded microprocessor with an external bus. In one configuration, the processor 92 views the signal detector 32 chip as a memory mapped peripheral. It issues commands to the signal detector 32 chip, and retrieves results after it has completed processing for a given set of commands. An RF receiver chip which embodies the functionality of the GPS radio receiver 82 of FIG. 5 code-named "Gemini/Pices Monopack", Part 'No. R6732-13, is available from the assignee of the subject application. Additional details regarding this implementation example are available in U.S. application having Ser. No. 09/145,055, previously incorporated herein by reference.

3. Signal Detector

Figure 7A:
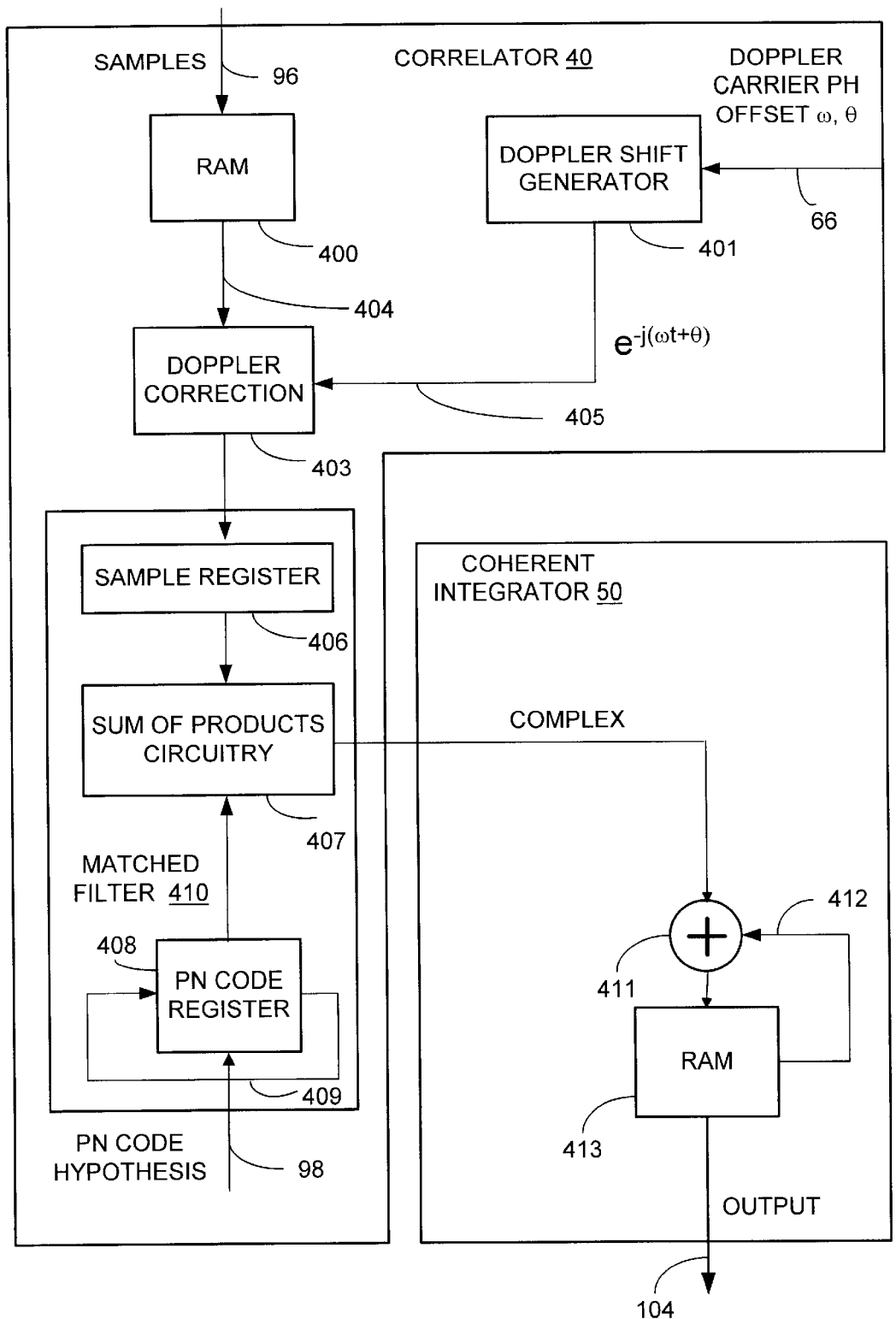
FIG. 7A illustrates via a high level block diagram an implementation example of the signal detector of FIG. 5.
Figure 7B:
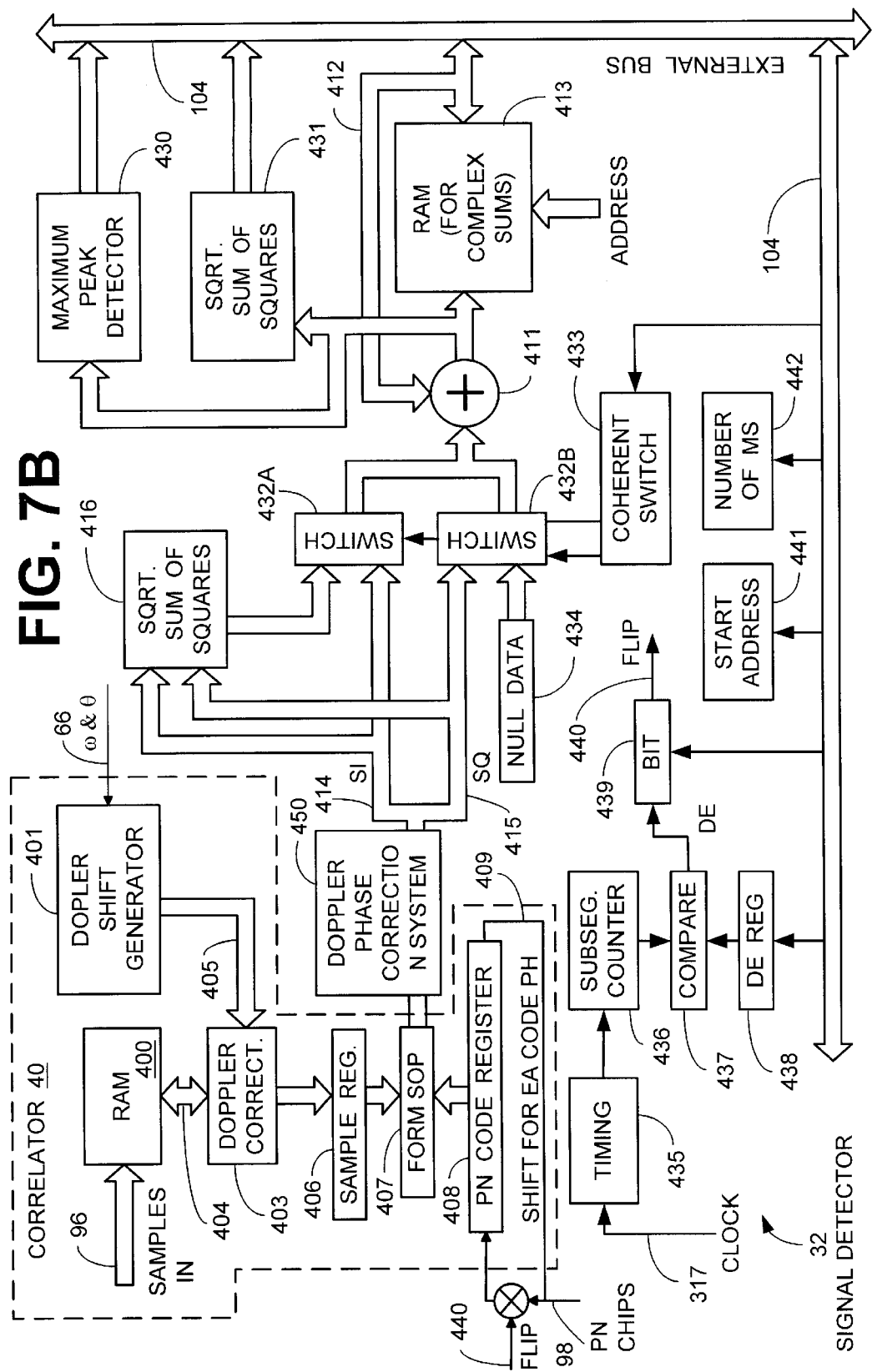
FIG. 7B illustrates via a low level block diagram the implementation example of the signal detector of FIG. 7A.

FIGS. 7A and 7B illustrate one possible nonlimiting example of signal detector 32 in FIG. 5. As illustrated, this example of the signal detector 32 comprises random access memory (RAM) 400 that is configured to receive input samples of the received baseband signal from sampling circuitry 84 over signal connection 96 (see also FIG. 5). In one implementation example, a frame is 20 ms in duration, and the RAM 400 is configured to receive one 20 ms frame of samples at a time. According to this implementation example, each 20 ms frame of samples comprises 40920 samples, obtained by sampling the baseband signal at a nominal sampling rate of 20.46 MHz, and then performing decimation filtering.

Also provided is Doppler correction circuitry 403 and Doppler shift generator 401, the latter receiving the carrier phase offset θ(t) 66 from the GPS processor 92 (FIG. 5). The RAM 400 is configured to provide to Doppler correction circuitry 403 over signal connection 404 at least a portion of a frame of samples stored therein at a time. In one implementation example, the frame of samples stored in RAM 400 is divided into subframes, and is provided to Doppler correction circuitry 403 one subframe at a time. In one implementation example, the duration of a subframe is equal to the period of the PN codes, which is currently set to 1 ms. In this implementation example, each subframe of samples comprises 2046 samples, with each sample represented as a complex number having an in-phase (I) and a quadrature (Q) component which are typically expressed in combination as I+jQ. According to this implementation example, each component, whether I or Q, is represented by 2 bits, and can take on any one of the discrete values −1, 0, or +1.

Doppler shift generator 401 generates a plurality of Doppler shift hypotheses that are provided to Doppler correction circuitry 403 over signal connection 405 one hypothesis at a time. In one implementation example, the Doppler shift generator 401 generates Doppler shift hypotheses in the range of ±62,000 Hz, to allow for additional inaccuracy in the local time base that is not corrected by the input sampling process. In order to initialize the Doppler shift generator 401, the GPS processor 92 (FIG. 5) sets the carrier phase offset Δθ to whatever initial value was used for the prior data capture interval, i.e., for the prior segment 62. For example, suppose in the prior interval the Doppler phase was initialized at 16 degrees and now Δθ is calculated as Δθ=362 degrees. Since full cycles have no effect, Δθ modulo 360 degrees =2 degrees and the foregoing is added to 16 degrees. Then, the carrier phase offset Δθ is initialized to 16+2=18 degrees for the new data segment 62.

Doppler correction circuitry 403 receives a subframe of samples from RAM 400 over signal connection 404, and a Doppler shift hypothesis from Doppler shift generator 401, and, responsive thereto, generates a corrected subframe of samples which are stored in sample register 406. Output from the doppler correction circuitry 403 is then sent to the matched filter 410, which in this embodiment, has a sample register 406, a sum of products (SOP) circuitry 407 and a PN code register 408. Additional detail about this procedure and the matched filter 410 is available in U.S. patent application Ser. No. 09/145,055, filed Sep. 1, 1998, entitled "DOPPLER CORRECTED SPREAD SPECTRUM MATCHED FILTER," previously incorporated by reference herein as though set forth in full. In general, the matched filter 410 convolutionally correlates chips of the PN code hypothesis with input samples via a series of multipliers associated with the SOP circuitry 407 and then the multiplication results are summed by the SOP circuitry 407 to produce an overall correlation value.

In one implementation example, each corrected subframe of samples continues to comprise 2046 complex samples, each having I and Q components. Each of the samples in this implementation example can take on any one of the discrete values −2, −1, 0, +1, and +2, which are represented by 3 bits for each of I and Q.

PN code register 408 is provided to store the current PN code hypothesis provided by PN code generator 90 (FIG. 5) over signal connection 98. In one implementation example, each PN code hypothesis represents one period of a PN code. In one implementation example, the PN code period is 1 ms, and each PN code hypothesis represents 1023 chips which repeats every 1 ms, representing a chip rate of 1.023 MHz. In this implementation example, the PN code register is configured to store 1023 chips at a time.

As indicated by signal connection 409, the PN code register is capable of being circularly shifted by an amount that corresponds to a code phase delay hypothesis. In the implementation example which has been discussed, in which the period of a PN code is 1023 chips, the value of the code phase delay can range from 0 to 2045 half chip increments. The PN code register is configured in this implementation example to be circularly shifted by any number or fraction of chips that correspond to a code phase delay hypothesis under consideration.

The SOP circuitry 407 is also provided as shown. This circuitry 407 is configured to form the integration of the product between the subframe of corrected samples stored in sample register 406 and the PN code hypothesis stored in the PN code register 408.

In the implementation example discussed carrier in which the subframe of samples stored in sample register 406 comprises 2046 samples, each having I and Q components, and the PN code hypothesis stored in PN code register 408 comprises 1023 chips, a correspondence is present between two of the samples in the sample register 406, and one of the chips in PN code register 408. The I and the Q components of each of the two samples is multiplied by the corresponding PN chip. Then, the sum of the I component products is determined, and the sum of the Q component products is separately determined. The sum of the I component products is output on signal connection 414 (FIG. 7B), and the sum of the Q component products is output on signal connection 415.

In equation form, the function of the sum of products circuitry 407 in this implementation example can be represented as follows:

$$SI = \sum_{i=1}^{1023} CHIP_i \times (I_i^1 + I_i^2) \qquad \text{(Eq. 1)}$$

$$SQ = \sum_{i=1}^{1023} CHIP_i \times (Q_i^1 + Q_i^2) \qquad \text{(Eq. 2)}$$

where $CHIP_i$ is the ith chip in the PN code hypothesis, $I_i^1$ is the I component of the first of the two samples corresponding to $CHIP_i$, $I_i^2$ is the I component of the second of the two samples corresponding to $CHIP_i$, $Q_i^1$ is the Q component of the first of the two samples corresponding to $CHIP_i$, and $Q_i^2$ is the Q component of the second of the two samples corresponding to $CHIP_i$.

Adder 411 and RAM 413 are also provided. If the subframe under consideration and stored in sample register 406 is the first subframe for the frame of interest, the foregoing complex SOP value (a correlation value) is stored in an array entry in RAM 413 corresponding to the combination of the PN code, Doppler shift, and code phase hypotheses under consideration. The arrays are in the format depicted in FIGS. 8A–8C and will eventually become the correlation arrays for the current PN hypothesis.

If the subframe under consideration and stored in sample register 406 is not the first subframe analyzed for the frame of interest, there may already be a previous complex value derived from a previous subframe stored in RAM 413 in the entry corresponding to the combination of the PN code, Doppler shift, and code phase hypotheses under consideration. In this case, the SS value determined above is added by adder 411 with the previously stored value that is provided to the adder 411 over signal connection 412. The result is then stored in lieu of the previously stored value in the array entry corresponding to the combined PN code, Doppler shift, and code phase hypotheses.

The next code phase hypothesis is then selected, and the PN code register 408 circularly shifted in accordance with the selected code phase hypothesis. The foregoing process is then repeated. This process continues for each of the code phase hypotheses that are desired to be tested. In one implementation example, 2046 code phases are tested for each 1 ms subframe, corresponding to the repetition period of the PN codes. In this implementation example, the code phase hypotheses that are tested range from 0 to 2045 half-chip increments, and the next code phase hypothesis is selected simply by circularly shifting the PN code register 408 by one-half chip.

Continuing now to FIG. 7B, shown is a signal detector 32 capable of two modes of operation. The couput of correlator 40, shown also in FIG. 71, is sent to the doppler phase correction system 450. The signal detector 32 is capable of two modes of operation controlled by the state of the coherent switch 433. The state of the coherent switch 433 can be set to either "0" or "1" by GPS processor 92 (FIG. 5). In a first mode of operation, defined when the state of switch 433 is set to "1", the signal detector 32 is configured to coherently integrate the SI and SQ values which have been computed with corresponding SI and SQ values determined for previous subsegments. In a second mode of operation, defined when the state of switch 433 is set to "0", the signal detector 32 is configured to non-coherently integrate the SI and SQ values which have been computed with corresponding SI and SQ values for previous subsegments.

The state of switch 433 controls the state of switches 432a and 432b. When switch 433 is set to "1", switches 432a and 432b are configured to pass directly to complex adder 411 the SI and SQ values from signal connections 414 and 415, respectively. When switch 433 is set to "0", switches 432a is configured to pass the output of sqrt. of sum of squares circuit 416 to complex adder 411, and switch 432b is configured to provide a null value to complex adder 411.

Complex adder 411 is configured to perform a complex addition of the two complex values provided at its two inputs, and to store the result in complex RAM 413. One of the inputs to complex adder 411 is provided from complex RAM 413 over signal connection 412. The other input is provided from switches 432a and 432b. The square-root (Sqrt.)-of-sum-of-squares circuit 416 is configured to receive the SI and SQ values on signal connections 414 and 415 respectively, and to compute the square root of the sum of the squares of these two values. In equation form, the circuit computes the value:

$$SS = \sqrt{(SI)^2 + (SQ)^2}. \quad (3)$$

Sqrt.-of-sum-of-squares circuit 431 is configured to receive a complex number from complex RAM 413 and compute the magnitude thereof, that is, the square root of the sum of the squares of the real and imaginary components thereof, or equivalently, the sum of the squares of the real and imaginary components. The result can then be stored back in complex RAM 413 through bus 104.

Note that, in connection with the circuit 431, there are other alternatives that can be used and could have advantages in various circumstances. The sum of the squares can be implemented, without the square root function. This is theoretically better, although a wider dynamic range into the RAM is needed, and wider words scaled appropriately are also needed. The approximation $SS = |Max| + \frac{1}{2}|Min|$ can also be used for SQ and SI, where Max is the larger of SQ and SI and Min is the lesser of SQ and SI. This approximation can be less circuitry and processor effort in some cases.

Maximum peak detector 430 is configured to receive a plurality of correlation values from RAM 413, and, responsive thereto, select a maximum thereof. Once selected, the maximum value is provided to connection 106 (bus), where it can be provided to GPS processor 92 (FIG. 5) and/or to complex RAM 413.

In an alternative embodiment, the peak detector 430 determines a set, for example, 8, of the largest values. There is an advantage to locating more than just the maximum value in the correlation array. The maximum is the estimated received code phase to within a half chip. The two adjacent values are used to refine the code phase estimate. However, other large values are an indication of multi-path and cross correlation signals. These can trigger additional tests to further qualify the estimated code phase that has been detected. The locations of the 8 largest values can be stored in an ordered list, with the location of the largest first, and then the next largest and so on. The foregoing implementation and process helps reduce processor loading.

Timing circuitry 86 from FIG. 5 provides a clock to timing circuit 435 over signal connection 317. Responsive thereto, timing circuit 435 generates a timing pulse for every subsegment. Counter 436 receives the timing pulses from timing circuit 435, and responsive thereto, counts the number of subsegments which have been processed by the signal detector 92. Register 438 stores the subsegment number at which the next frame boundary will occur. It is configured to be loaded with this number by GPS processor 92 (FIG. 5). In one implementation, in which a segment duration is 20 ms, and the subsegment duration is 1 ms, a segment boundary will occur every 20 subsegments.

Bit circuitry 439 is configured to store the value of the data signal modulated onto the signal of interest beyond the next frame boundary. It is configured to be loaded with this value by GPS processor 92 (FIG. 5) over bus 104. Bit circuitry 439 is also configured, responsive to the detection of a frame boundary by compare circuit 437, and the state of the next data bit, to determine whether there will be a phase reversal in the signal 321 (FIG. 7) of interest at the segment boundary. If the data signal does not change state at the frame boundary, then there will not a phase reversal at the frame boundary. Conversely, if the data signal changes state at the frame boundary, there will be a phase reversal at the frame boundary.

If there is a frame reversal at the frame boundary, the flip signal output from the bit circuitry 439 is asserted. This flip signal 440 is also provided as an input to incremental Doppler shift generator 401. Responsive to the assertion of this signal, incremental Doppler shift generator 401 flips the sign of the complex phasor that is multiplied by the current subsegment of samples by doppler correction 403. Thus, if the sign of the phasor is positive, and the flip signal 440 is then asserted, the sign of the complex phasor will become negative. In equation form, the complex phasor will go from $e^{jw_dt}$ to $-e^{jw_dt}$. Conversely, if the sign of the phasor is negative, and the flip signal 440 is then asserted, the complex phasor will go from $-e^{jw_dt}$ to $e^{jw_dt}$. When the modified phasor is multiplied by the incoming samples by doppler 403, a phase reversal of the samples is implemented to counteract the phase reversal caused by the change of state of the data signal at the frame boundary.

Note that the flip does not need to be applied to an entire 1 ms subsegment. The code epochs (CE) occur at one specific code phase of the code as defined in the GPS system. When the code is loaded into the code register 408, the chip representing the CE is at the end of the code register 408 (shift register). Hence, for this code phase, the flip would apply to the entire 1 ms of data. When the code chips are cyclically shifted, the position of the code epoch (and therefore the potential location of a data epoch, DE) is within the array. Hence, by flipping the sign of the entire array, some portion of that array is destructively integrated. This is acceptable because, at worst, the resulting error can be arranged to be no more than ½ ms. This represents a maximum signal loss of 1 ms out of 20, or on the order of 20 log10 ($^{19}/_{20}$)=−0.45 dB. The average loss would be about half that of 20 log10 ($^{39}/_{40}$)=−0.22 dB.

With this consideration, it is also apparent that the flip can be accomplished at the output of the SOP 407, since all data for a given 1 ms is either negated, or not. This could be accomplished, for example, by allowing the adder 411 be an adder/subtractor. These alternatives are the logic designer's choice, made to minimize power, area, delay, or whatever the limiting design issue turns out to be.

There is also a way to implement a phase flip that travels with the cyclically shifting code chips. The flip bit is disposed at the end of the code register 408, and an XOR logic operation is performed on the code chips when they are shifted around to the other end of the register 408. The XOR operation is only done if the flip bit is asserted. That way the flip would travel around with the CE boundary. This functionality can be accomplished with less logic than the other alternatives. Note that the flip is only applied once and then the chips are left flipped. It is possible that an XOR gate(s) could be disposed at the shift register input, so the chips can be loaded in an already inverted state. That is needed to continue an inverted process in a later 20 ms data capture. With reference to FIG. 10, to add this feature, an XOR gate(s) is inserted in connection 98 for PN code register loading and in connection 409 for cyclic shifting. The flip bit output, as currently drawn, can be used to control the XOR gate(s). The operation is a little different, in that there might have to be a special value to make the compare fire during PN loading and the flip bit is only on for on segment, while the compare is "equal" rather than "equal or greater" as in the present concept.

The data epoch timing and data bit values stored respectively in DE register 438 and bit circuitry 439 is typically derived from a source other than the GPS waveform from which the samples stored in RAM 400 are derived.

Registers 441 and 442 are used to store, respectively, the start address of the samples in the segment of samples stored in RAM 400 that integration is to start at, and the number of ms that the integration is to proceed over. These two registers are loadable by GPS processor 92 over bus 104. Together, they are used to define an arbitrary portion of the current segment over which integration is to proceed.

In a first mode of operation, switch 433 is set to "1", indicating that coherent integration is to be carried out. A segment of complex samples is stored in RAM 400. One subsegment at a time, the samples are multiplied by a complex phasor to correct for Doppler shift and stored in sample register 406. The samples are then multiplied by the PN code stored in register 408, and the SI and SQ sum of products values computed by SOP circuitry 407. The SI and SQ values are then provided over signal connections 414 and 415 respectively, and added by complex adder 411 to any corresponding values previously stored in complex RAM 413 for previous subsegments of the segment stored in RAM 400.

If the subsegment under consideration and stored in sample register 406 is the first subsegment for the segment of interest, the foregoing values are stored in an array entry in RAM 413 corresponding to the combination of the PN code, Doppler shift, and code phase hypotheses under consideration. The arrays are of the same format as those depicted in FIGS. 8A–8C and will eventually become the correlation arrays for the current segment of samples in RAM 400.

If the subsegment under consideration and stored in sample register 406 is not the first subsegment analyzed for the segment of interest, there may already be a value derived from a previous subsegment stored in RAM 413 in the entry corresponding to the combination of the PN code, Doppler shift, and code phase hypotheses under consideration. In this case, the SI and SQ values determined above are added by adder 411 to the previously stored values for the entry which are provided to the adder 411 over signal connection 412. The result is then stored in lieu of the previously stored values in the array entry corresponding to the combined PN code, Doppler shift, and code phase hypotheses.

The signal detector 32 of FIGS. 7A and 7B is configured to perform the foregoing tasks for each of the subframes of the frame stored in the RAM 400. When this process has been completed, correlation arrays 500, 501, 502 of the form shown in FIG. 8 are present in RAM 413. These correlation arrays 500, 501, 502, are provided to the GPS processor 92 (FIG. 5) over signal connection 106. GPS processor 92 combines these correlation arrays 500, 501, 502 with correlation arrays 500, 501, 502 derived from a previous segment 62 in the manner described previously.

4. Correlation Arrays

Figure 8A:
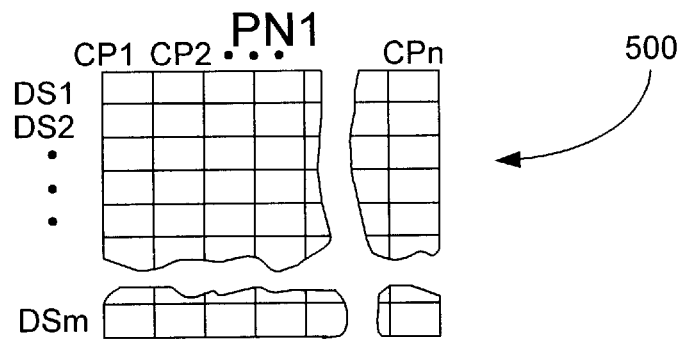
FIG. 8 illustrates examples of data structures output by the signal detector of FIG. 5 situated within the GPS receiver of FIG. 5.
Figure 8B:
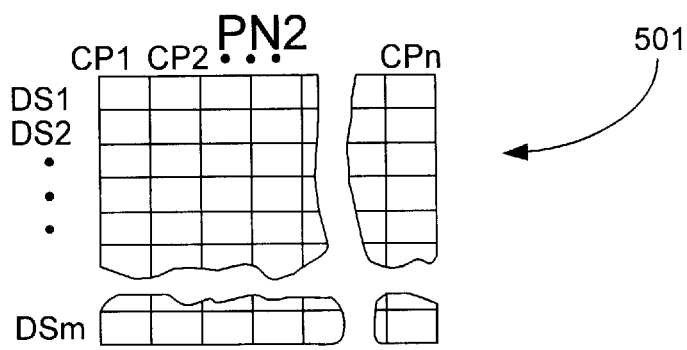
Figure 8C:
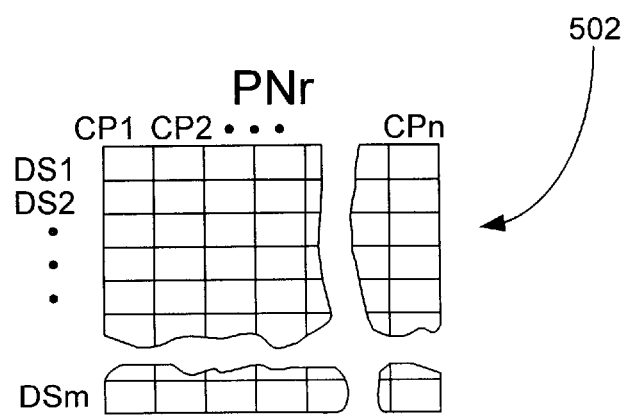

As illustrated in FIGS. 8A–8C, for each segment 62 of samples, the signal detector 32 outputs a plurality of correlation arrays 500, 501, 502 of complex (I+jQ) data derived from the segment 62 of samples. According to this implementation example, each array 500, 501, 502 corresponds to a PN code hypothesis, PN1, PN2, . . . PNr, each row of an array 500, 501, 502 corresponds to a Doppler shift hypothesis, DS1, DS2, . . . DSm, each column of an array 500, 501, 502 corresponds to a code phase hypothesis, CP1, CP2, . . . CPn, and each entry in an array 500, 501, 502 is a measure of the degree to which the combined PN code, Doppler shift, and code phase hypothesis corresponding to the entry correlates to the samples. Thus, in FIG. 8A, reference numeral 500 identifies a correlation array corresponding to PN code hypothesis PN1; in FIG. 8B, reference numeral 501 identifies a correlation array corresponding to PN code hypothesis PN2; and in FIG. 8C. reference numeral 502 identifies a correlation array corresponding to PN code hypothesis PNr.

As is clear from FIGS. 8A–8C, the correlation arrays 500, 501, 502, respectively, for segments 62 are grouped by PN code hypothesis and by Doppler shift hypothesis for a given PN code hypothesis. The result is that each grouping corresponds to a particular combination of PN code hypothesis and Doppler shift hypothesis. The correlation arrays 500, 501, 502 are coherently combined one grouping at a time. According to this implementation example, the GPS processor 92 (FIG. 5) receives these groupings over signal connection 106 and coherently cumulatively combines these correlation arrays 500, 501, 502 as additional segments 62 are captured. For a particular satellite 12a, 12b or 12c (FIG. 1), the combination process continues until a threshold SNR is obtained for the satellite 12a, 12b or 12c. The correlation arrays 500, 501, 502 corresponding to a satellite 12a, 12b or 12c are coherently combined until the presence and range of the satellite 12a, 12b or 12c can be accurately determined. Typically, this occurs when the correlation value for a particular set of hypotheses is significantly greater than the correlation value for alternative hypotheses.

In accordance with this invention, the correlation arrays 500, 501, 502 derived from different segments 62 of samples are coherently combined using an algorithm that accounts for the differing Doppler phases between the segments 62. In one example, a plurality of cumulative correlation arrays are maintained, which are initially set equal to the correlation arrays derived from a first segment 62 of samples. The correlation arrays 500, 501, 502 for a second segment 62 of samples are then coherently combined with the cumulative correlation arrays 500, 501, 502, one row at a time, by adding real component parts together and imaginary component parts together. The foregoing combining process is then repeated for additional data in the correlation arrays 500, 501, 502 for following segments 62, until, for a given satellite 12a, 12b or 12c, the SNR is sufficient to permit the presence and range of the satellite 12a, 12b or 12c to be accurately determined.

Figure 9:
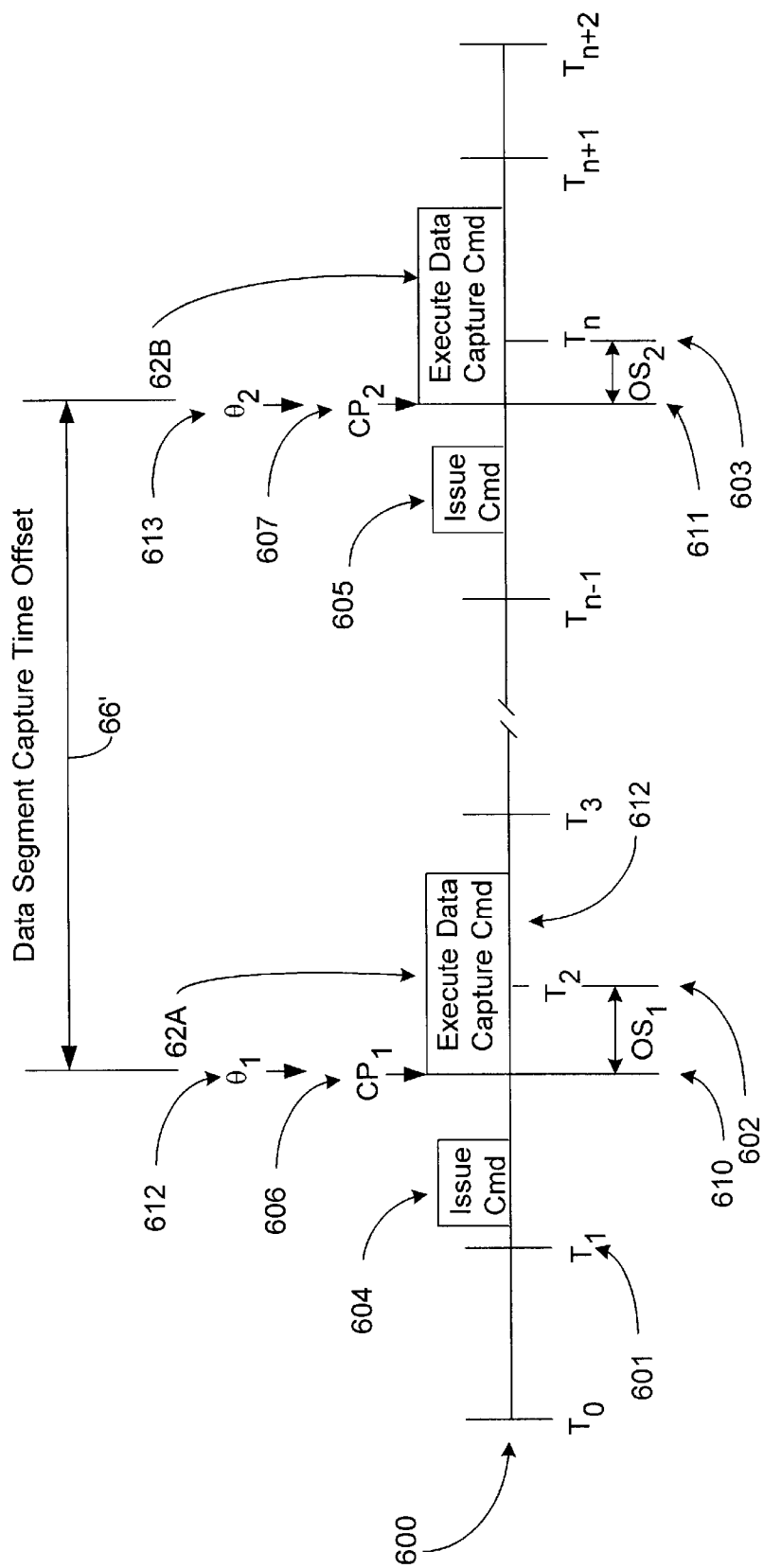
FIG. 9 illustrates an example of a timing diagram for illustrating the process of combining carrier and code phase shifts to enable coherent accumulation of data correlation values in the signal detector of FIG. 5 situated within the GPS receiver of FIG. 5.

Processing of a first segment 62a (FIG. 3) and a second segment 62b is illustrated in FIG. 9. Local time base 600 associated with GPS receiver 800 (FIG. 5) is divided into frames by frame marks $T_1, T_2, \ldots T_n$. In one implementation example, the duration of a frame is 20 ms. Upon detecting the occurrence of frame mark $T_1$, identified in the FIG. 9 with reference numeral 601, GPS processor 92 (FIG. 5) issues a command, identified by reference numeral 604, to capture a first segment 62a (set) of samples. The capture of the first segment 62a of samples begins at time 610. As indicated, the first segment 62a of samples is assumed to span at least one frame. The offset measurement circuitry 88 (FIG. 5) detects the next occurrence of a frame mark, $T_2$, identified in the FIG. 9 with numeral 602, and, responsive thereto, determines the offset, $OS_1$, between the time 610 that capture of the segment 62a began, and the time 602 of the frame mark $T_2$.

The segment 62a of samples is typically representative of the combination of transmissions from multiple ones of GPS satellites 12a, 12b or 12c (FIG. 1), each of which has a different code phase as measured at the receiver 82 (FIG. 5). In relation to a particular satellite 12a, 12b or 12c of interest, the segment 62a will have a specific code phase, $CP_1$, which is identified in the FIG. 9 with reference numeral 606.

After the occurrence of a number of additional frame marks, $T_3, \ldots T_{n-1}$, the GPS processor 92 (FIG. 5) issues another command to capture a segment 62 of samples. This second command is identified in the FIG. 9 with numeral 605, and is assumed to occur after the GPS processor 92 has detected the occurrence of frame mark $T_{n-1}$. The capture of the second segment 62b begins at a time denoted by reference numeral 611. Again, the second segment 62b is assumed to span at least one frame. The next frame mark, $T_n$, occurs at time 603. The offset measurement circuitry 88 (FIG. 5) measures the offset, $OS_2$, between the beginning 611 of the second segment 62b, and the occurrence 603 of the next frame mark $T_n$. This second frame is assumed to have a particular code phase, $CP_2$, which is defined in relation to a particular satellite 12a, 12b or 12c (FIG. 1). The time $\Delta T$ in the foregoing equations is the difference in time between the beginning 611 of the second segment 62b, and the beginning 610 of the first segment 62a, and the value $\Delta CP$ in the foregoing equations is the difference in code phase between the code phase for the first segment 62a, $CP_1$, and that for the second segment 62b, $CP_2$. Significantly, this value is determined from the foregoing equations even though the underlying code phases $CP_1$ and $CP_2$ are unknown.

5. Operation

Figure 10A:
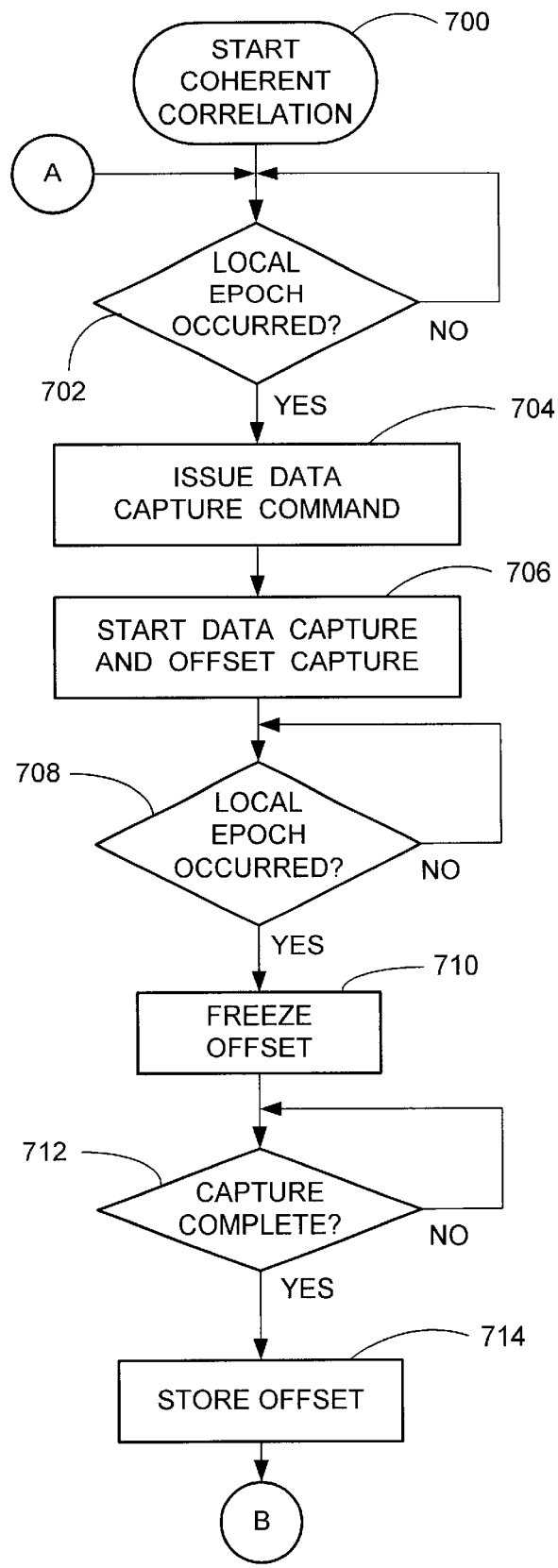
Figure 10B:
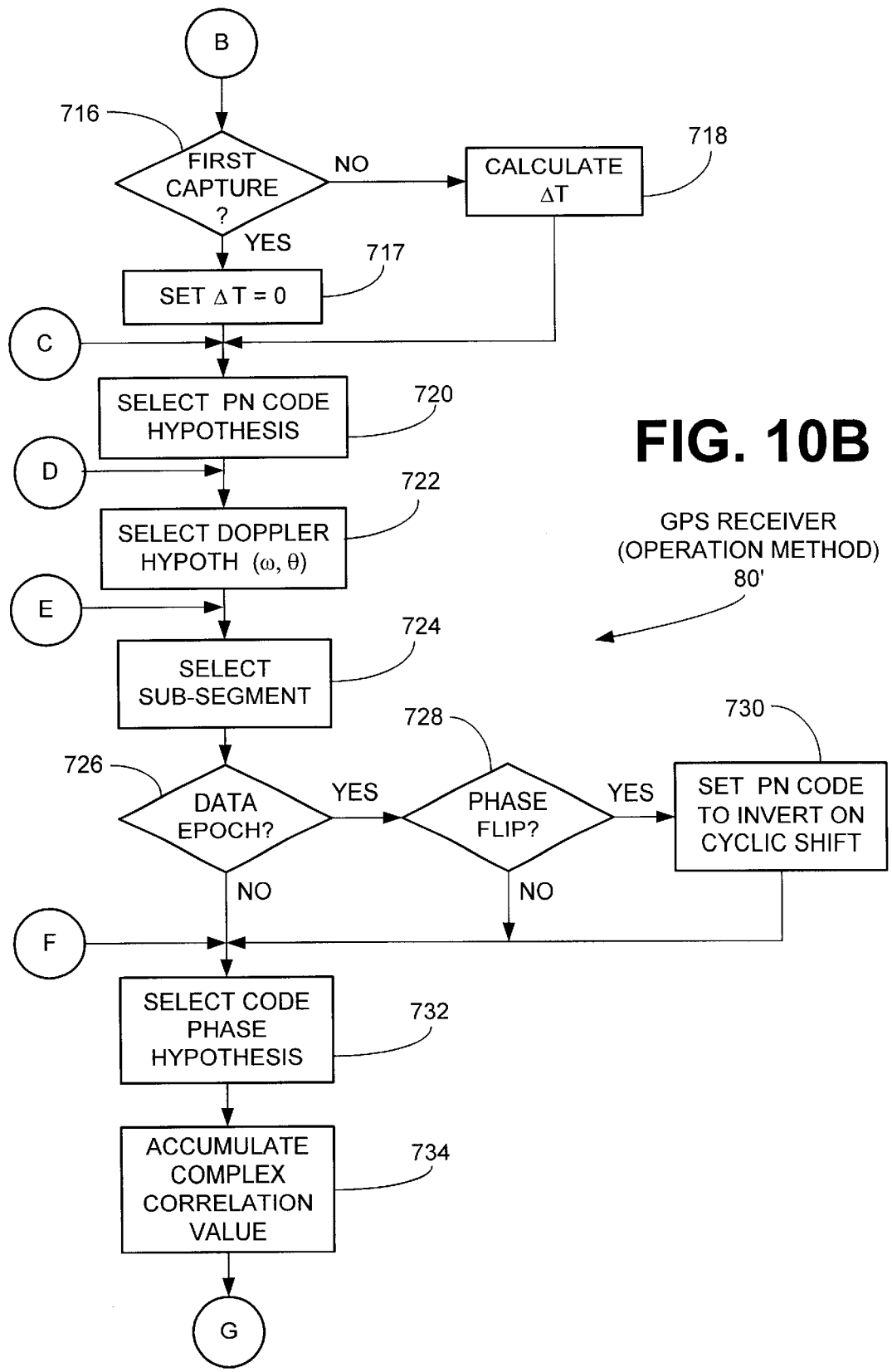

FIGS. 10A–10C are flow charts showing an implementation example 80' of a method of coherent accumulation of correlation values for non-uniform and disjoint segments 62 (FIG. 3) of captured sample data in the GPS receiver 82 (FIG. 5; its signal detector 32 in FIGS. 2 and 5). This is essentially a process that is controlled by the GPS processor 92 (FIG. 5), as it executes and is programmed to act based upon suitable software.

In FIG. 10A at step 700, the process starts. In the implementation example illustrated here, the GPS processor 92 (FIG. 5) issues commands to the hardware in response to an external interrupt that is controlled by local timing signals. These local timing signals are represented in FIG. 9 as the local timing epochs labeled $T_k$, where k=0 . . . (n+2). Specific instances in FIG. 9 are $T_2$ at reference 602 and $T_n$ at reference 603.

As shown in FIG. 10A, the GPS processor 92 waits for one of these interrupts before issuing a command to capture data samples from the GPS radio receiver 82 (FIG. 5). The purpose of this procedure is to ensure that the command will be issued and data capture begun between two local timing epochs $T_k$ having known indices.

When the GPS processor 92 issues the data capture command to the hardware, two hardware events take place either simultaneously or with a known timing relationship. First, the sampling circuitry 84 (FIG. 5) begins storing data in sample RAM 400 (FIG. 7). Second, the offset measurement circuitry 88 (FIG. 5; e.g., a timing counter) begins measuring the time from the start of data capture until the next local timing epoch $T_k$. Step 702 indicates the occurrence of the processor interrupt, step 704 indicates that the data capture command is issued, and step 706 shows the fixed hardware sequence of data capture start and offset counter start associated with the offset measurement circuitry 88.

During data capture, the local timing signal is monitored by the offset measurement circuitry 88. The offset measurement circuitry 88 continues to measure elapsed time by counting a clock until another local timing epoch $T_k$ is detected, as indicated by step 708. When the local timing epoch $T_k$ is detected, the counter start associated with the offset measurement circuitry 88 stops counting (freeze offset), as indicated by step 710. Data capture continues until the specified amount of data has been sampled and stored in RAM 400 (FIG. 7). At that point, the capture is complete, as indicated by step 712, and the GPS processor 92 (FIG. 5) reads the offset counter value and stores it in RAM 400 or another suitable memory, as indicated in step 714, for further use.

Continuing on to FIG. 10B, in step 716, the GPS processor 92 sets the value of measured time between the current data capture and any prior data capture. If there has been no prior data capture, this value, denoted $\Delta T$, is set to zero at step 717. If there has been a prior capture, the value is computed in step 718 from the differences of the local timing epoch counts and the measured offsets from start of data capture to local timing epochs $T_k$ in the two instances of data capture according to the following equation. The terms in the equations are as defined in FIG. 9. Note the data segment capture time offset $\Delta T$, is denoted by reference numeral 64' in FIG. 9, and is computed as follows:

$$\Delta T = T_n - T_2 + OS_1 - OS_2 \qquad (Eq\ 3)$$

The captured data is then processed multiple times in accordance with the various hypotheses of PN code, Doppler error, and code phase for each of several sub-segments (in this example, corresponds to 1 ms of carrier signal) of the captured data.

In step 720, the specific PN code for the current hypothesis is loaded into the code register 408 (FIGS. 7A and 7B), pursuant to appropriate control signals from the GPS processor 92. Next, the current Doppler hypothesis is selected in step 722 by the GPS processor 92. The Doppler hypothesis in this step consists of the carrier Doppler frequency and the carrier Doppler phase to be used to correct the carrier phase error in the current data capture. This step is further illustrated in FIG. 3 and FIG. 9. As shown in FIG. 9, the carrier phases at the start of two successive data captures are denoted as $\theta_1$ and $\theta_2$. These phases are not known, but their difference can be calculated from $\Delta T$. The carrier phase difference, $\Delta\theta$, is calculated as follows.

$$\Delta\theta = 2\pi * D_{carr} * \Delta T (modulo\ 2\pi) \qquad (Eq.\ 4)$$

The application of this phase difference to adjust the carrier Doppler phase is shown in FIG. 3. This concept can be extended to an arbitrary sequence of data segments 62 as follows. The initial phase, $\theta_0$, is considered to be zero for the first data capture. For data capture interval k, the phase change is based on all the accumulated time since the start of the first data capture interval. The time difference between each succeeding pair of data captures is denoted $\Delta T_k$ and is calculated according to the procedure of equation (3). The total time since the start of the first data capture to the start of the $k^{th}$ capture, $T_k$, and the initial carrier Doppler correction phase, $\theta_i$, is then calculated as:

$$T_k = \sum_{i=1}^{k} \Delta T_i \qquad (Eq.\ 5)$$

$$\theta_k = \sum_{i=1}^{k} \Delta\theta_i \qquad (Eq.\ 6)$$

A slight refinement may also be made to the calculation of $\theta_k$ based on the potential availability of knowledge of the rate of change of carrier Doppler, $DR_{carr}$. The carrier Doppler signal 60 (FIG. 3) is not constant with time. Since the satellites 12a, 12b and 12c (FIG. 1) move in their orbits between successive data segments 62, the carrier Doppler signal 60 changes to some extent. This rate term is available from almanac and ephemeris data and may also be provided to the GPS receiver 80 (FIG. 5) over another communication channel. In fact, the E911 network aiding message standards allow for providing not only the carrier Doppler signals of the visible satellites 12a, 12b or 12c, but also the rate of change (Hz/sec) in the carrier Doppler signals. This rate term may be consequential if the coherent integration extends over time periods where the carrier Doppler rate of change is significant. In this case, the calculation of $\Delta\theta_k$ is modified as in equation (7):

$$\Delta\theta_k = 2\pi \cdot (D_{carr} + DR_{carr} \cdot T_{k-1}) \cdot \Delta T_k (mod\ 2\pi) \qquad (Eq.\ 7)$$

If this refinement is applied, then the corresponding refinement to the carrier Doppler correction radian frequency $\omega_k$ should also be made according to equation (8). Note that in equations (7)–(8), $T_0=0$. This is consistent with the implementation assumption that the applied Doppler correction frequency during each data capture interval is constant and the correction for rate is only applied at the start of a capture time.

$$\omega_k = 2\pi \cdot (D_{carr} + DR_{carr} \cdot T_{k-1}) \qquad (Eq.\ 8)$$

In step 724, a sub-segment of the current data capture is selected for processing. Sub-segments are defined to accommodate the amount of data that the correlator 40 (FIGS. 2 and 6A) can handle at one time. In the case of the current matched filter 410 (FIG. 7A), this is conveniently defined as 1 ms of data, which is nominally 2046 samples at a sample spacing of one half C/A code chip. Consequently, the sub-segment corresponds to the nominal C/A code period of 1023 chips.

In conjunction with selecting the sub-segnient, as indicated in step 724, the GPS processor 92 detects the case where the current sub-segment includes a data epoch 324 (DE; see FIG. 7), as indicated at step 726. In this case, as denoted at step 728, the GPS processor 92 detects the case where the data epoch 324 is the occasion of a carrier phase inversion due to 50 Hz data modulation on the satellite signal 12a, 12b or 12c (FIG. 1) corresponding to the current PN code hypothesis. The data epoch location and phase inversion information may be derived locally, for example, based on prior signal tracking and data collection or on timing and data information derived from and external communication channel. If a phase inversion is known or hypothesized at the current code epoch during sub-segment selection of step 724, then the hardware is set by assertion of the flip signal 440 (FIG. 7B) to invert an appropriate signal, such as, for example but not limited to, inverting the PN code at the point it is cyclically shifted in its PN code register 408 (FIGS. 7A and 7B).

In step 732, the current code phase hypothesis is used by the GPS processor 92 to compute the corresponding correlation value. The resulting complex value is accumulated in the output storage cell, or RAM 413 (FIGS. 7A and 7B), for that hypothesis of PN code, carrier Doppler, and code phase for the current data capture in step 734.

Continuing on to FIG. 10C, at step 738, the number of code phase hypotheses to be made is examined by the GPS processor 92 (FIG. 5). If more hypotheses are required, the process returns to step 732 (FIG. 10B). Otherwise, the process proceeds to step 740.

In step 740, the number of sub-segments to be processed is examined. If there are additional sub-segments to be processed, the process returns to step 724 (FIG. 10B). Otherwise, the process proceeds to step 742.

At the point of step 742, a complete data capture has been processed by the GPS processor 92 for a given PN code and Doppler hypothesis. If this data capture is the first, then the correlation values for this hypothesis are used to initialize a storage area corresponding to this hypothesis in the RAM 413 (FIGS. 7A and 7B). If it is not the first data capture, then the corresponding storage area has been previously initialized in RAM 413, and the correlations resulting from the data capture just processed must be coherently combined with the prior data of the corresponding hypothesis. In the latter case, step 742 is followed by step 744. In the former case, step 742 is followed directly by step 746, where the corresponding data storage is initialized.

Step 744 compensates the code phase Doppler error of the correlation values of the current data capture. Since the GPS L1 C/A signal construction has exactly 1540 RF cycles per C/A code chip, the Doppler effect on the code phase is proportionally smaller than the effect on the carrier phase. To first order then, $D_{code}=D_{carr}/1540$. With reference to FIG. 9 and equations (3) and (5), the total code phase shift between the first data capture and the $k^{th}$ data capture can be determined as in equation (9), as follows:

$$\Delta CP_k = (F_{code}+D_{code}) \cdot T_k (\text{mod } 1023 \text{ chips}) \quad (\text{Eq. 9})$$

The nominal C/A code chip rate $F_{code}$ is $1.023 \times 10^6$ chips/second. The typical values of $D_{code}$ are only a few chips per second, so that second order correction for the rate of change of code Doppler would generally not be required. The shift value can be rounded to the nearest half chip value. The correlation values would be shifted by this amount and coherently combined with the prior corresponding correlation values. Following this adjustment, step 744 would be followed by step 746, where the corresponding correlation values of the same hypothesis would be combined.

In step 748, a test is performed by the GPS processor 92 to determine if additional carrier Doppler hypotheses are required. If so, the process returns to step 722 (FIG. 10B). If not, the process proceeds to step 750. At step 750, a test is made to determine if additional PN code hypotheses remain to be made. If so, the process returns to step 720 (FIG. 10B). If not, the process proceeds to step 752.

At step 752, a test is performed by the GPS processor 92 to see if additional data capture intervals are required. In general, this test is adjusted after each accumulation of correlation values for a given data capture. The control GPS processor 92 is configured to periodically inspect the accumulated correlation arrays 500, 501, 502 (FIGS. 8A–8C) to determine if a correlation peak is present which exceeds all other peaks in the array 500, 501, 502 for that hypothesis by a sufficient margin to declare a detection of a signal for that PN code. If such detection has occurred, the corresponding PN code is removed from the list of PN code hypotheses to be accumulated. Consequently, at steps 748, 750 and 752, it can be the case that no further hypotheses remain to be addressed by virtue of all the PN codes (that is, satellites 12a, 12b and 12c of FIG. 1) have had signals detected and been removed from the pending list of hypotheses. In the alternative, where not all of the PN codes have detectable signal present, the test in step 752 ultimately terminates with a last data capture established by a maximum allowed value.

When test 752 indicates that the last hypothesis has been tested, the process terminates in step 754.

Typically, as the process of FIGS. 10A–10C iterates, there will be fewer PN code and Doppler shift hypotheses to test on each pass. This reduction occurs because some PN codes (satellites 12a, 12b or 12c of FIG. 1) will have been detected and because the range of Doppler uncertainty that needs to be tested may be reduced based on observing the Doppler values at which previous satellites 12a, 12b or 12c have been detected.

Also, it should be appreciated that the parameters which are collected for each set of data samples change. For example, with reference to FIG. 9, the first pass may be directed to the parameters $OS_1$, $T_2$, and $CP_1$. The second pass, however, may be directed to the parameters $T_n$, $OS_2$, and $CP_2$.

It should also be appreciated that the data capture process is not limited to a fixed 20 ms data epoch or segment length. In general, it can be adjusted on each pass to a variable length. In one implementation example, it can be adjusted on each pass to a variable length of from 1 to 20 ms, in 1 ms increments. In other implementation examples, longer periods are possible simply by increasing the amount of RAM 400 (FIGS. 7A and 7B).

Upon the completion of the process of FIGS. 10A–10C, in one implementation example, the GPS processor 92 (FIG. 5) has stored within its memory a plurality of correlation arrays, with each array corresponding to a particular PN code hypothesis, and with each row of an array corresponding to a particular Doppler shift hypothesis. Each array represents the combined results derived from multiple sets of samples.

C. Advantages/Conclusions

The foregoing embodiments, implementations, and implementation examples improve the SNR of a correlation array. The approach described has a number of advantages, which are as follows:

1. The embodiments, implementations, and examples are adaptable to any time base. This means that they can be applied to GPS chip sets, cellular, and PCS chip sets, and standard microprocessors.

2. The embodiments, implementations, and implementation examples allow for the combination of non-uniform receiver sample capture lengths. This is critical for integrated applications such as cellular and PCS, in which it is desirable to receive GPS when the phone is not transmitting. Since the available idle slots will have different durations in the various phone standards, adaptability of time intervals is important.

3. The embodiments, implementations, and implementation examples allow arbitrary offsets in the start of the data capture times. This again is most important for phone applications, but it is also important for the basic GPS application. In the GPS application, a flexible start time capability allows the same capture to be used with any satellite 12a, 12b or 12c (FIG. 1) in the received samples, regardless of their relative code phases.

4. Multiple data capture combining allows SNR to be built up incrementally. After each increment is added, the arrays can be tested for signal detection, and processing for successful acquisitions curtailed.

5. Processor RAM and throughput is minimized. This is important for phone applications, in which the baseband device's digital signal processor (DSP) and protocol stack processors may be busy and RAM limited. For high SNR cases, the entire required RAM for a given PN code is located on or within the signal detector 32 (FIGS. 2 and 5). When data combining is required to improve SNR, only those satellites 12a, 12b or 12c (FIG. 1) that have not been detected need be processed. Further, it is often possible in phone systems to reduce the size of the array to less than 2046 elements per PN code and Doppler shift hypothesis, and to a few Doppler shift hypotheses, using information that is inherent in mobile phone network operation.

6. While the discussion here has focused on GPS, the invention can be applied to any system using correlation methods for detecting signals. This would include most spread spectrum systems, and general signal detectors.

Finally, note that although embodiments and implementations have been described which utilize a GPS processor to perform various functions, it should be understood that embodiments are possible in which a generic processor is used to perform these functions. For purposes of this disclosure, a generic processor is defined to mean any device, including a computer, DSP, baseband processor, microprocessor, or microcomputer, which is capable of executing a discrete series of instructions stored in a memory accessible by the processor. It should also be understood that embodiments are possible in which analog circuitry is used to perform these functions.

D. Other Embodiments

The present invention can be implemented in the system described in U.S. Pat. No. 5,825,327, entitled "GPS Receivers And Garments Containing GPS Receivers And Methods For Using These GPS Receives," which is incorporated by reference.

U.S. Pat. No. 5,825,327 discloses a GPS receiver having multiple GPS antennas. Also described is a method of tracking employing the GPS receiver and a communication transmitter. Also described is a garment having a GPS receiver, a GPS antenna, a communication antenna, and a communication transmitter.

The present invention can be implemented in the system described in U.S. Pat. No. 5,945,944, entitled "Method And Apparatus For Determining Time For GPS Receivers," which is incorporated by reference.

U.S. Pat. No. 5,945,944 discloses a method and apparatus of determining the time for a global positioning system receiver. Timing signals derived from a communication system, such as cellular phone transmission signals, are received by a GPS receiver and decoded to provide accurate time information. The timing signals may be in the form of synchronized events marked by timing indicators, or as system time information. The timing signals in combination with satellite position signals received by the GPS receiver are used to determine the position of the GPS receiver.

The present invention can be implemented in the system described in U.S. Pat. No. 5,831,574, entitled "Method And Apparatus For Determining the Location OF An Object Which May Have An Obstructed View Of The Sky," which is incorporated by reference.

U.S. Pat. No. 5,831,574 discloses the following. A positioning sensor receives and stores a predetermined record length of positioning signals while in a fix position located such that the positioning sensor can receive positioning signals. Thereafter, the stored positioning signals rare processed to determine the geographic location of a the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with t depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,884,214, entitled "GPS Receiver And Method For Processing GPS Signals," which is incorporated by reference.

U.S. Pat. No. 5,884,214 discloses the following. A global positioning system (GPS) receiver has first circuitry for receiving and processing pseudorandom sequences transmitted by a number of GPS satellites. The first circuitry is configured to perform conventional correlation operations on the received pseudorandom sequences to determine pseudoranges from the GPS receiver to the GPS satellites. The GPS receiver also includes second circuitry coupled to the first circuitry. The second circuitry is configured to receive and process the pseudorandom sequences during blockage conditions. The second circuitry processes the pseudorandum sequences by digitizing and stoning a predetermined record length of the received sequences and then performing fast convolution operations on the stored data to determine the pseudoranges. The GPS receiver may have a common circuitry for receiving GPS signals form in view satellites and downconverting the RF frequency of the received GPS signals to an intermediate frequency (IF). The IF signals are split into two signal paths; a first of which provides the conventional correlation processing to calculate the pseudoranges. During blockage conditions, the IF signal is passed to the second signal path wherein the IF signals are digitized and stored in memory and later processed using the fast convolution operations to provide the pseudoranges. Alternative arrangements for the two signal paths include separate downconverters or shared digitizers. One embodiment provides both signal paths on a single integrated circuit with shared circuitry executing computer readable instructions to perform GPS signal processing appropriate to the reception conditions.

The present invention can be implemented in the system described in U.S. Pat. No. 5,874,914, entitled "GPS Receiver Utilizing A Communication Link", which is incorporated by reference.

U.S. Pat. No. 5,874,914 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 6,016,119, entitled "Method And Apparatus For Determining The Location Of An Object Which May Have An Obstructed View Of The Sky," which is incorporated by reference.

U.S. Pat. No. 6,016,119 discloses the following. A positioning sensor receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,781,156, entitled "GPS Receiver And Method For processing GPS Signals," which is incorporated by reference.

U.S. Pat. No. 5,781,156 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 5,841,396, entitled "GPS Receiver Utilizing A Communication Link," which is incorporated by reference.

U.S. Pat. No. 5,841,396 discloses the following. A precision carrier frequency signal for calibrating a local oscillator of a GPS receiver which is used to acquire GPS signals. The precision carrier frequency signal is sued to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a basestation via a communication link. The remote GPS receiver unit uses this satellite almanac data to determine approximate Doppler data for satellites in view of the remote GPS receiver unit.

The present invention can be implemented in the system described in U.S. Pat. No. 5,999,124, entitled "Satellite Positioning System Augmentation With Wireless Communication Signals," which is incorporated by reference.

U.S. Pat. No. 5,999,124 discloses a method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement which represents a time of travel of the SPS signals is also determined. A position of the SPS receiver is determined from a combination of at least the time measurement which represents the time of travel of a message in the cell based communication signals and from a time measurement which represents a time travel of the SPS signals. The cell based communication signals are capable of communicating data messages in a two-way direction in one embodiment between the cell based transceiver and the communication system.

The present invention can be implemented in the system described in U.S. Pat. No. 6,002,363, entitled "Combined GPS Positioning System And Communications System Utilizing Shared Circuitry," which is incorporated by reference.

U.S. Pat. No. 6,002,363 discloses a combined GPS and communication system having shared circuitry. The combined system includes an antenna for receiving data representative of GPS signals, a frequency converter coupled to the antenna, a frequency synthesizer coupled to the frequency converter, an analog to digital converter coupled to the frequency converter and a processor coupled to the frequency converter. The processor processes the data representative of GPS signals to determine a pseudorange based on the data representative of GPS signals to determine a pseudorange based on the data representative of GPS signals. The integrated communication receiver includes a shared component which is at least one of the antenna, the frequency converter, the frequency synthesizer and the analog to digital converter. Typically, in certain embodiments, the processor also demodulates communication signals received as well as controls the modulation of data to be transmitted as a communication signal through a communication link.

While various embodiments of the application have been described, it will be apparent to those of ordinary skill in the art that many more embodiments and implementations are possible that are within the scope of the subject invention. Accordingly, the invention is not to be restricted except in light of the appended claims and their equivalents.

What is claimed is:

1. A system comprising:
   a receiver configured to receive a first segment of a signal and a second segment of the signal, the first and second segments acquired during separate periods of time, the first and second segments having non-uniform lengths, the signal comprising a signal of interest perturbed by noise or pseudo-noise;

a correlator coupled to the receiver, the correlator configured to derive first correlation data representative of a first correlation between the first segment and a hypothesis, the correlator configured to impose a carrier offset upon the second segment so that a carrier phase of the second segment corresponds to that of the first segment, the correlator configured to derive second correlation data representative of a second correlation between the phase shifted second segment and the hypothesis; and a combiner coupled to the correlator, the combiner configured to coherently combine the first and second correlation data to obtain cumulative correlation data useful for detecting the signal of interest or a parameter of the signal of interest.

2. The system of claim 1, wherein the combiner is further configured to determine a code phase offset between the first and second correlation data, to adjust a selected one of the first and second correlation data responsive to the code phase offset, and to combine the adjusted data with the other of the first and second correlation data.

3. The system of claim 1, wherein the receiver is an RF receiver.

4. The system of claim 1, wherein the signal of interest is a carrier signal modulated with a repeating PN code.

5. The system of claim 1, wherein the correlator is a matched filter.

6. The system of claim 1, wherein the correlator is a processor.

7. The system of claim 1, wherein the combiner is a processor.

8. The system of claim 1, wherein the combiner is configured to successively combine the correlation data for successive segments until the signal of interest or a parameter of interest can be accurately and reliably detected.

9. The system of claim 7, wherein the parameter of the signal of interest is the carrier signal.

10. The system of claim 7, wherein the parameter of the signal of interest is the presence of the signal.

11. A system comprising:

first means for acquiring a first segment of a signal and a second segment of the signal during separate periods of time, the first and second segments having non-uniform lengths, the signal comprising a signal of interest perturbed by noise or pseudo-noise;

second means for deriving first correlation data representative of a first correlation between the first segment and a hypothesis, for imposing a carrier offset upon the second segment so that a carrier phase of the second segment corresponds to that of the first segment, for deriving second correlation data representative of a second correlation between the phase shifted second segment and the hypothesis; and third means for coherently combining the first and second correlation data to obtain cumulative correlation data useful for detecting the signal of interest or a parameter of the signal of interest.

12. The system of claim 11, wherein the third means further performs the function of determining a code phase offset between the first and second correlation data, to adjust a selected one of the first and second correlation data responsive to the code phase offset, and to combine the adjusted data with the other of the first and second correlation data.

13. The system of claim 11, wherein the first means is an RF receiver.

14. The system of claim 1 wherein the signal of interest is a carrier signal modulated with a repeating PN code.

15. The system of claim 11, wherein the second means is a matched filter.

16. The system of claim 11, wherein the second means is a processor.

17. The system of claim 11, wherein the third means is a processor.

18. The system of claim 11, wherein the third means performs the function of successively combine the correlation data for successive segments until the signal of interest or a parameter of interest can be accurately and reliably detected.

19. The system of claim 11, wherein the parameter of the signal of interest is the carrier signal code phase of the signal.

20. The system of claim 11, wherein the parameter of the signal of interest is the presence of the signal.

21. A computer read able medium having a program, the program comprising:

logic to acquire a first segment of a signal and a second segment of the signal that have been sampled during separate time periods, the first and second segments having nonuniform lengths, the signal comprising a signal of interest perturbed by noise or pseudo-noise;

logic to derive first correlation data representative of a first correlation between a first segment of a signal and a hypothesis, for imposing a carrier phase offset upon the second segment so that a carrier phase of the second segment corresponds to that of the first segment, for deriving second correlation data representative of a second correlation between the phase shifted second segment and the hypothesis; and logic to coherently combine the first and second correlation data to obtain cumulative correlation data useful for detecting the signal of interest or a parameter of the signal of interest.

22. A system comprising:

a receiver for receiving a first segment of a signal and a second segment of the signal, the signal representative of a plurality of signals of interest, each signal of interest representative of a repeating PN code modulated onto a carrier signal, the first and second segments having non-uniform lengths, and the first and second segments representing separate and distinct periods of time;

a correlator coupled to the receiver for deriving first correlation data representative of the correlation between the first segment and a combined PN code and code phase hypothesis, the correlator configured to impose a carrier phase offset upon the second segment so that a carier phase of the second segment corresponds to that of the first segment, the correlator configured to derive second correlation data representative of a second correlation between the phase shifted second segment and the combined code and code phase hypothesis; and a combiner coupled to the correlator for determining a code phase difference between portions of the first and second correlation data corresponding to the PN code hypothesis, for adjusting a selected one of the portions of the first and second correlation data responsive to the code phase difference, and combining the adjusted data with the other portion to obtain cumulative correlation data useful for detecting a signal of interest or a parameter of a signal of interest.

23. A method comprising the steps of:
acquiring a first segment of a signal and a second segment of the signal during separate time periods, the first and second segments having non-uniform lengths, the signal comprising a signal of interest perturbed by noise or pseudo-noise;
deriving first correlation data representative of a first correlation between the first segment and a hypothesis;
imposing a carrier phase offset upon the second segment so that a carrier phase of the second segment corresponds to that of the first segment;
deriving second correlation data representative of a second correlation between the phase shifted second segment and the hypothesis; and
coherently combining the first and second correlation data to obtain cumulative correlation data useful for detecting the signal of interest or a parameter of the signal of interest.

24. The method of claim 23, further comprising the steps of:
determining a code phase offset between the first and second correlation data;
adjusting a selected one of the first and second correlation data responsive to the code phase offset; and
combining the adjusted data with the other of the first and second correlation data.

25. The system of claim 23, wherein the acquiring step is performed with an RF receiver.

26. The system of claim 23, wherein the signal of interest is a carrier signal modulated with a repeating PN code.

27. The system of claim 23, wherein the deriving steps are performed using a matched filter.

28. The system of claim 23, wherein the deriving steps are performed using a processor.

29. The system of claim 23, wherein the combining step is performed using a processor.

30. The system of claim 23, wherein the parameter of the signal of interest is the carrier signal code phase of the signal.

31. The system of claim 23, wherein the parameter of the signal of interest is the presence of the signal.

32. A computer readable medium having a program comprising:
logic configured to acquire a first segment of a signal and a second segment of the signal during separate time periods, the first and second segments having non-uniform lengths, the signal comprising a signal of interest perturbed by noise or pseudo-noise;
logic configured to derive first correlation data representative of a first correlation between a first segment and a hypothesis;
logic configured to impose a carrier phase offset upon the second segment so that a carrier phase of the second segment corresponds to that of the first segment;
logic configured to derive a second correlation data representative of a second correlation between the phase shifted second segment and the hypothesis; and
logic configured to coherently combine the first and second correlation data to obtain cumulative correlation data useful for detecting the signal of interest or a parameter of the signal of interest.

33. The computer readable medium of claim 32, further comprising:

logic configured to determine a code phase offset between the first and second correlation data;
logic configured to adjust a selected one of the first and second correlation data responsive to the code phase offset; and
logic configured to combine the adjusted data with the other of the first and second correlation data.

34. The computer readable medium of claim 32, wherein the logic configured to acquire a first segment of a signal and a second segment of the signal is implemented in an RF receiver.

35. The computer readable medium of claim 32, wherein the signal of interest is a carrier signal modulated with a repeating PN code.

36. The system of claim 32, wherein the logic configured to derive second correlation data is implemented in a matched filter.

37. The system of claim 32, wherein the parameter of the signal of interest is the carrier signal code phase of the signal.

38. The system of claim 32, wherein the parameter of the signal of interest is the presence of the signal.

39. A GPS receiver, comprising:
a first GPS antenna coupled to a digital memory, the digital memory storing first digitized signals obtained through the first GPS antenna;
a second GPS antenna coupled to a digital memory, the digital memory storing first digitized signals obtained through the second GPS antenna;
a digital processor coupled to the digital memory, the digital processor processing the first digitized signals after being stored in the digital memory to provide first position information and processing the second digitized signals after being stored in the digital memory to provide second position information;
a receiver configured to receive a first segment of a signal and a second segment of a signal, the first and second segments acquired during separate periods of time, the first and second segments having non-uniform lengths, the signal comprising a signal of interest perturbed by noise or pseudo-noise;
a correlator coupled to the receiver, the correlator configured to derive first correlation data representative of a first correlation between the first segment and a hypothesis, the correlator configured to impose a carrier phase offset upon the second segment so that a carrier phase of the second segment corresponds to that of the first segment, the correlator configured to derive second correlation data representative of a second correlation between the phase shifted second segment and the hypothesis; and
a combiner coupled to the correlator configured to coherently combine the first and second correlation data to obtain cumulative correlation data useful for detecting the signal of interest or a parameter of the signal of interest.

40. A method of operating a GPS receiver, the method comprising:
receiving first GPS signals through a first GPS antenna;
digitizing the first GPS signals to provide first digitized signals and storing the first digitized signals in a first digital memory;
receiving second GPS signals through a second GPS antenna;
digitizing the second GPS signals to provide second digitized signals and storing the second digitized signals in one of the first digital memory and a second digital memory;

processing in a digital processor the stored first digitized signals to provide a first position information and processing the stored second digitized signals to provide a second position information;

selecting one of the first position information and the second position information to provide a selected position information;

when performing the processing step, performing the following steps upon one or both of the first and second GPS signals:

acquiring a first segment of a signal and a second segment of the signal during separate time periods, the first and second segments having non-uniform lengths, the signal comprising a signal of interest perturbed by noise or pseudo-noise;

deriving first correlation data representative of a first correlation between the first segment and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

41. A method for determining a position of a mobile global positioning system receiver, the mobile global positioning system receiver receiving global positioning system signals from at least one of a plurality of global positioning system (GPS) satellites, the method comprising:

receiving a cellular communication signal in a mobile communication receiver coupled to the mobile global positioning system receiver, the cellular communication signal having a time indicator which represents a time event;

associating the time indicator with data representing a time of arrival of a GPS satellite signal at the mobile global positioning system receiver;

determining position information of the mobile global positioning system receiver, wherein the data representing the time of arrival of the GPS satellite signal and the time indicator are used to determine the position information of the mobile global positioning system receiver and wherein the cellular con nun cation signal supports 2-way communications; and when performing the determining step:

acquiring a first segment of a signal and a second segment of the signal during separate time periods, the first and second segments having non-uniform lengths, the signal comprising a signal of interest perturbed by noise or pseudo-noise;

deriving first correlation data representative of a first correlation between the first segment and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

42. A method of operating a global positioning system (GPS) receiver, comprising:

sensing whether GPS signals are capable of being received from GPS satellites and providing an activation signal when the GPS signals are capable of being received;

maintaining the GPS receiver in a low power state;

activating the GPS receiver form the lower power state upon detecting the activation signal;

acquiring a first segment of a signal and a second segment of a GPS signal during separate time periods, the first and second segments having non-uniform lengths, the signal comprising a signal of interest perturbed by noise or pseudo-noise;

deriving first correlation data representative of a first correlation between the first segment and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

43. A method for using a dual mode GPS receiver, the method comprising the steps of:

activating the GPS receiver in a first mode of operation, including, receiving GPS signals from, in view satellites;

downconverting and demodulating the GPS signals to extract Doppler information regarding in view satellites and to compute pseudorange information;

storing the Doppler information;

detecting when the GPS receiver is experiencing blockage conditions and activating a second mode of operation in response thereto, the second mode including, digitizing the GPS signals at a predetermined rate to produce sampled GPS signals;

acquiring a first segment of a signal and a second segment of a GPS signal during separate time periods, the first and second segments having non-uniform lengths, the signal comprising a signal of interest perturbed by noise or pseudo-noise;

deriving first correlation data representative of a first correlation between the first segmnent and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

44. In a method for determining the position of a remote unit a process comprising:

receiving, at the remote unit from a transmission cell in a cellular communication system, a Doppler information of a satellite in view of the remote unit;

computing, in the remote unit, position information for the satellite by using the Doppler information without receiving and without using satellite ephemeris information; and when computing the position information, performing the following steps:
  acquiring a first segment of a signal and a second segment of the signal during separate time periods, the first and second segments having non-uniform length, the signal comprising a signal of interest perturbed by noise or pseudo-noise;
  deriving first correlation data representative of a first correlation between the first segment and a hypothesis;
  imposing a carrier phase offset upon the second segnent so that a carrier phase of the second segment corresponds to that of the first segment;
  deriving second correlation data representative of a second correlation between the phase shifted second segment and the hypothesis; and
  coherently combining the first and second correlation data to obtain cumulative correlation data useful for detecting the signal of interest or a parameter of the signal of interest.

45. A method of using a base station for providing a communications link to a mobile GPS unit, the method comprising:
  determining Doppler information of a satellite in view of the mobile GPS unit, wherein the Doppler information is used by the mobile GPS unit to determine a position information for the satellite;
  transmitting from a transmission cell in a cellular communication system the Doppler information of the satellite in view to the mobile GPS unit wherein the mobile GPS unit determines the position information without receiving and without using satellite ephemeris information; and
  when performing the determining step, performing the following steps:
    acquiring a first segment of a signal and a second segment of the signal during separate time periods, the first and second segments having non-uniform lengths, the signal comprising a signal of interest perturbed by noise or pseudo-noise;
    deriving first correlation data representative of a first correlation between the first segment and a hypothesis;
    imposing a carrier phase offset upon the second segment so that a carier phase of the second segment corresponds to that of the first segment;
    deriving second correlation data representative of a second correlation between the phase shifted second segment and the hypothesis; and
    coherently combining the first and second correlation data to obtain cumulative correlation data useful for detecting the signal of interest or a parameter of the signal of interest.

46. A method of determining the location of a remote object, comprising the steps of:
  transporting a positioning sensor to a remote object;
  repositioning the positioning sensor to a fix position such that the positioning sensor is capable of receiving positioning signals, the fix position being in a known position relative to the position of the remote sensor;
  storing a predetermined amount of data in the positioning sensor while the positioning sensor is located at the fix position, the data comprising the positioning signals;
  processing the data to determine the location of the fix position;
  computing the location of the remote object using the location of the fix position; and
  when performing the processing step, performing the following steps:
    acquiring a first segment of a signal and a second segment of a signal during separate time periods, the first and second segments having non-uniform lengths, the signal comprising a signal of interest perturbed by noise or pseudo-noise;
    deriving first correlation data representative of a first correlation between the first segment and a hypothesis;
    imposing a carrier phase offset upon the second segment so that a carrier phase of the second segment corresponds to that of the first segment;
    deriving second correlation data representative of a second correlation between the phase shifted second segment and the hypothesis; and
    coherently combining the first and second correlation data to obtain cumulative correlation data useful for detecting the signal of interest or a parameter of the signal of interest.

47. A method of tracking a remote object comprising the steps of:
  fitting a remote object with a positioning sensor configured to receive and store positioning information when the remote object is in a fix position;
  positioning the remote object in a fix position such that the positioning sensor is capable of detecting an activation signal;
  receiving and storing a predetermined amount of data in the positioning sensor, the data comprising positioning information;
  processing the data to determine the location of the fix position; and
  when processing the data, performing the following steps:
    acquiring a first segment of a signal and a second segment of a signal during separate time periods, the first and second segments having non-uniform lengths, the signal comprising a signal of interest perturbed by noise or pseudo-noise;
    deriving first correlation data representative of a first correlation between the first segment and a hypothesis;
    imposing a carrier phase offset upon the second segment so that a carrier phase of the second segment corresponds to that of the first segment;
    deriving second correlation data representative of a second correlation between the phase shifted second segment and the hypothesis; and
    coherently combining the first and second correlation data to obtain cumulative correlation data useful for detecting the signal of interest or a parameter of the signal of interest.

48. A computer readable medium containing a computer program having executable code for a GPS receiver, the computer program comprising:
  first instruction for receiving GPS signals from in view satellites, the GPS signals comprising pseudorandom (RN) codes;
  second instructions for digitizing the GPS signals at a predetermined rate to produce sampled GPS signals;
  third instructions for storing the sampled GPS signals in a memory; and fourth instructions for processing the sampled GPS signals by performing a plurality of convolutions on the sampled GPS signals, the processing comprising performing the plurality of convolutions on a corresponding plurality of blocks of the sampled GPS signals to provide a plurality of corresponding results of each convolution and summing a plurality of mathematical representations of the plurality of corresponding results to obtain a first position information; and wherein the further instructions are designed to:
acquire a first segment of a signal and a second segment of a signal during separate time periods, the first and second segments having non-uniform lengths, the signal comprising a signal of interest perturbed by noise or pseudo-noise;
derive first correlation data representative of a first correlation between the first segment and a hypothesis;
impose a carrier phase offset upon the second segment so that a carrier phase of the second segment corresponds to that of the first segment;
derive second correlation data representative of a second correlation between the phase shifted second segment and the hypothesis; and
coherently combine the first and second correlation data to obtain cumulative correlation data useful for detecting the signal of interest or a parameter of the signal of interest.

49. A computer readable medium containing an executable computer program for use in a digital processing system, the executable computer program when executed in the digital processing system causing the digital processing system to perform the steps of:
performing a plurality of convolutions on a corresponding plurality of blocks of sampled GPS signals to provide a plurality of corresponding results of each convolution; and
summing a plurality of mathematical representations of the plurality of corresponding results to obtain a first position information; and
when performing the plurality of convolutions step, performing at least the following steps:
acquiring a first segment of a signal and a second segment of the signal during separate time periods the first and second segments hair non-uniform lenths, the signal comprising a signal of interest perturbed by noise or pseudo-noise;
deriving first correlation data representative of a first correlation between the first segment and a hypothesis;
imposing a carrier phase offset upon the second segment so that a cater phase of the second segment corresponds to that of the first segment;
deriving second correlation data representative of a second correlation between the phase shifted second segment and the hypothesis; and
coherently combining the first and second correlation data to obtain cumulative correlation data useful for detecting the signal of interest or a parameter of the signal of interest.

50. A method of calibrating a local oscillator in a mobile GPS receiver, the method comprising:
receiving a precision carrier frequency signal from a source providing the precision carrier frequency signal;
automatically locking to the precision carrier frequency signal and providing a reference signal;
calibrating the local oscillator with the reference signal, the local oscillator being used to acquire GPS signals;
acquiring a first segment of a signal and a second segment of a GPS signal during separate time periods, the first and second segments having non-uniform lengths, the signal comprising a signal of interest perturbed by noise or pseudo-noise;
deriving first correlation data representative of a first correlation between the first segment and a hypothesis;
imposing a carier phase offset upon the second segment so that a carrier phase of the second segment corresponds to that of the first segment;
deriving second correlation data representative of a second correlation between the phase shifted second segment and the hypothesis; and
coherently combining the first and second correlation data to obtain cumulative correlation data useful for detecting the signal of interest or a parameter of the signal of interest.

51. A method of using a base station to calibrate a local oscillator in a mobile GPS receiver, the method comprising:
producing a first reference signal having a precision frequency;
modulating the first reference signal with a data signal to provide a precision carrier frequency signal;
transmitting the precision carrier frequency signal to the mobile GPS receiver, the precision carrier frequency signal being used to calibrate a local oscillator in the mobile GPS receiver, the local oscillator being used to acquire GPS signals;
acquiring a first segment of a signal and a second segment of a GPS signal during separate time periods, the first and second segments having non-uniform lengths, the signal comprising a signal of interest perturbed by noise or pseudo-noise;
deriving first correlation data representative of a first correlation between the first segment and a hypothesis;
imposing a carrier phase offset upon the second segment so that a carrier phase of the second segment corresponds to that of the first segment;
deriving second correlation data representative of a second correlation between the phase shifted second segment and the hypothesis; and
coherently combining the first and second correlation data to obtain cumulative correlation data useful for detecting the signal of interest or a parameter of the signal of interest.

52. A method of deriving a local oscillator signal in a mobile GPS receiver, the method comprising:
receiving a precision carrier frequency signal from a source providing the precision carrier frequency signal;
automatically locking to the precision carrier frequency signal and providing a reference signal;
using the reference signal to provide a local oscillator to acquire GPS signals;
acquiring a first segment of a signal and a second segment of a GPS signal during separate time periods, the first and second segments having non-uniform lengths, the signal comprising a signal of interest perturbed by noise or pseudo-noise;
deriving first correlation data representative of a first correlation between the first segment and a hypothesis;
imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

53. A method of processing position information, the method comprising:

receiving GPS signals from at least one GPS satellite;

transmitting cell base communication signals between a communication system coupled to the GPS receiver and a first cell based transceiver which is remotely positioned relative to the GPS receiver wherein the cell based communication signals are Wireless;

determining a first time measurement which represents a time of travel of a message in the cell based communication signals in a cell based communication system which comprises the first cell based transceiver and the communication system;

determining a second time measurement which represents a time of travel of the GPS signals;

determining a position of the GPS receiver from at least the first time measurement and the second time measurement wherein the cell based communication signals are capable of communicating data messages in a two-way direction between the first cell based transceiver and the communication system;

performing the following steps during at least one of the determining steps:

acquiring a first segment of a signal and a second segment of a GPS signal during separate time periods the first and second segments having non-uniform lengths, the signal comprising a signal of interest perturbed by noise or pseudo-noise;

deriving first correlation data representative of a first correlation between the first segment and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

54. A method of processing position information in a digital processing system, the method comprising:

determining a first time measurement which represents a time of travel of a message in cell based communication signals in a cell based communication system which comprises a first cell based transceiver which communicates with the digital processing system and a communication system which communicates in a wireless manner with the first cell based transceiver, determining a position of a GPS receiver from at least the first time measurement and a second time measurement which represents a time of travel of GPS Signals received at the GPS receiver which is integrated with the communication system and is remotely located relative to the first cell based transceiver and the digital processing system, wherein the cell based communication signals are capable of communicating messages from the communication system to the first cell based transceiver; and performing the following steps when determining the position:

acquiring a first segment of a signal and a second segment of a signal during separate time periods, the first and second segments having non-uniform lengths, the signal comprising a signal of interest perturbed by noise or pseudo-noise;

deriving first correlation data representative of a first correlation between the first segment and a hypothesis;

imposing a carrier phase offset upon the second segment so that a carrier phase of the second segment corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

55. A method of controlling a communication link and processing data representative of GPS signals from at least one satellite in a GPS receiver, the method comprising:

processing the data representative of GPS signals from at least one satellite in a processing unit, including performing a correlation function to determine a pseudo-range based on the data representative of the GPS signals;

controlling communication signals through the communication link by using the processing unit to perform the controlling and wherein the processing unit performs demodulation of communications signal sent to the GPS receiver; and when performing the processing step, performing at least the following steps:

acquiring a first segment of a signal and a second segment of a GPS signal during separate time periods, the first and second segments having non-uniform lengths, the signal comprising it signal of interest perturbed by noise or pseudo-noise;

deriving first correlation data representative of a first correlation between the first segment and a hypothesis;

imposing a carrier phase offset upon the second segmnent so that a carrier phase of the second segmnent corresponds to that of the first segment;

deriving second correlation data representative of a second correlation between the phase shifted second segment and the hypothesis; and coherently combining the first and second correlation data to obtain cumulative correlation data useful for detecting the signal of interest or a parameter of the signal of interest.

* * * * *